United States Patent
Malee et al.

(10) Patent No.: US 10,148,826 B2
(45) Date of Patent: Dec. 4, 2018

(54) METHODS AND APPARATUS TO INTERFACE WITH DIFFERENT SERVICE PROVIDER INFORMATION TECHNOLOGY SYSTEMS SUPPORTING SERVICE ORDERING

(71) Applicants: AT&T Intellectual Property I, L.P., Atlanta, GA (US); AT&T Mobility II LLC, Atlanta, GA (US)

(72) Inventors: Daniel P. Malee, Wheaton, IL (US); Jeloni Shabazz, Richardson, TX (US); Robert Hammond, Richardson, TX (US); Laury Ann Wills, Little Silver, NJ (US); Gregory Miller, Boca Raton, FL (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 507 days.

(21) Appl. No.: 14/839,563

(22) Filed: Aug. 28, 2015

(65) Prior Publication Data
US 2017/0064088 A1 Mar. 2, 2017

(51) Int. Cl.
*H04M 15/00* (2006.01)
*H04W 4/24* (2018.01)
*H04W 4/12* (2009.01)

(52) U.S. Cl.
CPC ............ *H04M 15/61* (2013.01); *H04W 4/12* (2013.01); *H04W 4/24* (2013.01)

(58) Field of Classification Search
CPC .......... H04M 15/61; H04W 4/12; H04W 4/24
See application file for complete search history.

(56) References Cited

U.S. PATENT DOCUMENTS

| 6,925,160 B1 | 8/2005 | Stevens et al. |
| 8,099,078 B2 | 1/2012 | Lazaridis |

(Continued)

FOREIGN PATENT DOCUMENTS

| CA | 2782886 | 1/2013 |
| CA | 2880904 | 2/2014 |

(Continued)

OTHER PUBLICATIONS

Syed Mubashir Ali, "Prospects and Challenges of Implementing Enterprise Mobility Management—Case of a Large Telecom Service Provider in United Arab Emirates", Research Gate, Sep. 5, 2013, vol. 10, No. 8, (5 pages).

(Continued)

*Primary Examiner* — Joseph Dean, Jr.
(74) *Attorney, Agent, or Firm* — Hanley, Flight & Zimmerman, LLC

(57) ABSTRACT

Example methods disclosed herein include accessing first messaging received from an enterprise mobility management system to identify a first device, the first messaging conforming to a first set of application programming interfaces. Disclosed example methods also include exchanging respective instances of second messaging with respective ones of multiple different service provider information technology systems supporting service ordering to identify a first one of the service provider information technology systems associated with the first device, the respective instances of the second messaging including first data from the first messaging and conforming to respective second sets of application programming interfaces, different from the first set of application programming interfaces, that are specific to the respective ones of the different service provider information technology systems. Disclosed example methods further include exchanging third messaging with the first (Continued)

one of the service provider information technology systems to determine service offerings available for the first device.

15 Claims, 14 Drawing Sheets

(56) References Cited

U.S. PATENT DOCUMENTS

| | | | |
|---|---|---|---|
| 8,396,075 | B2 | 3/2013 | Skoczkowski et al. |
| 8,406,732 | B2 | 3/2013 | Cai et al. |
| 8,634,407 | B2 | 1/2014 | Mohammed et al. |
| 8,695,058 | B2 | 4/2014 | Batchu et al. |
| 8,744,935 | B2 | 6/2014 | Friedholm et al. |
| 8,924,469 | B2 | 12/2014 | Raleigh et al. |
| 2010/0299152 | A1 | 11/2010 | Batchu et al. |
| 2013/0006673 | A1 | 1/2013 | Hurston et al. |
| 2013/0267198 | A1 | 10/2013 | DeBenedictis et al. |
| 2014/0173692 | A1 | 6/2014 | Srinivasan et al. |
| 2014/0228071 | A1 | 8/2014 | Villarrubia Grande et al. |
| 2014/0279454 | A1 | 9/2014 | Raman et al. |
| 2014/0341083 | A1 | 11/2014 | Shim et al. |
| 2015/0109967 | A1 | 4/2015 | Hogan et al. |
| 2015/0172899 | A1 | 6/2015 | Sharma et al. |
| 2017/0048326 | A1* | 2/2017 | Smith .............. H04L 67/141 |

FOREIGN PATENT DOCUMENTS

| | | |
|---|---|---|
| CA | 2847507 | 11/2014 |
| WO | 2013078140 | 5/2013 |
| WO | 2013173270 | 11/2013 |

OTHER PUBLICATIONS

Mary Huyck Mulka, "Bring Your Own Device Proposal for English Composition II Students in Fort Hays State University and Sias International University's Dual-degree Program", BYOD Policy 3, Dec. 5, 2012 (11 pages).

Chris Rose, Ph.D., "BYOD: An Examination of Bring Your Own Device in Business", Review of Business Information Systems—Second Quarter 2012, vol. 17, No. 2, (pp. 65-70).

Niharika Singh, "B.Y.O.D. Genis Is Out of the Bottle—Devil or Angel", Journal of Business Management & Social Sciences Research (JBM&SSR), vol. 1, No. 3, Dec. 2012 (12 pages).

* cited by examiner

METHODS AND APPARATUS TO INTERFACE WITH DIFFERENT SERVICE PROVIDER INFORMATION TECHNOLOGY SYSTEMS SUPPORTING SERVICE ORDERING

FIELD OF THE DISCLOSURE

This disclosure relates generally to service provider information technology systems and, more particularly, to methods and apparatus to interface with different service provider information technology systems supporting service ordering.

BACKGROUND

With increasing frequency, enterprises are allowing, or even expecting, their employees to utilize their personal mobile devices as a part of their work activities. This is commonly referred to as a bring your own device (BYOD) policy. However, one issue faced when managing BYOD policies is compensating employees for charges incurred when using their personal mobile devices for performing work functions. Many enterprises would like to pay for these charges and typically do so today by offering stipends to their employees. However, such stipends may inaccurately reflect real usage charges incurred by the employees.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
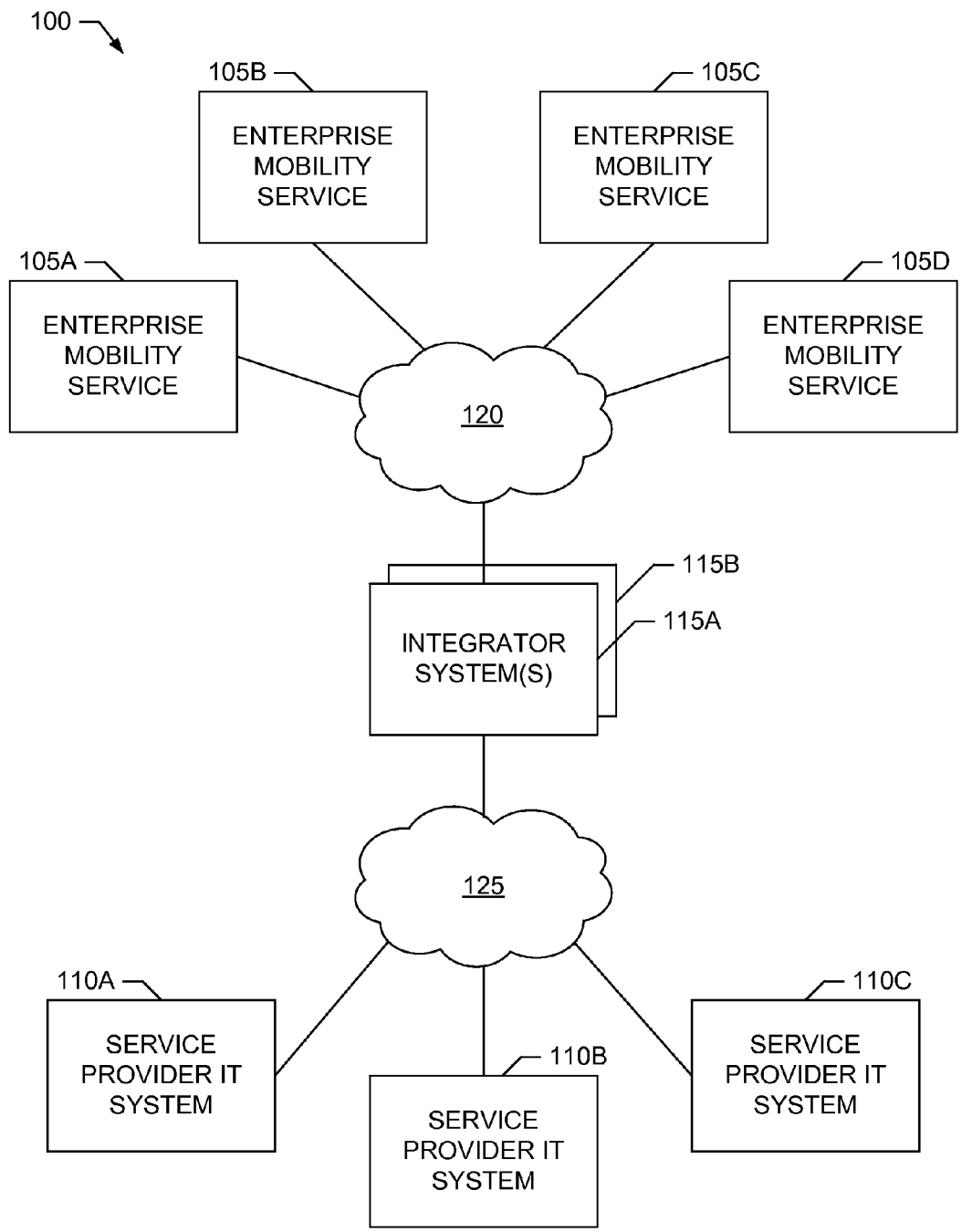
FIG. 1 is a block diagram of an example system to interface one or more example enterprise mobility services with multiple different service provider information technology systems supporting service ordering in accordance with the teachings of this disclosure.

Methods, apparatus and articles of manufacture (e.g., physical storage media) to interface enterprise mobility service(s) with different service provider information technology systems supporting service ordering are disclosed herein. Example methods disclosed herein to interface an enterprise mobility service with multiple, different service provider information technology systems supporting service ordering include accessing first messaging received (e.g., via a network) from the enterprise mobility service (e.g., implemented by an enterprise mobility management system) to identify a first device, with the first messaging conforming to a first set of application programming interfaces. Such disclosed example methods also include exchanging respective instances of second messaging with respective ones of the different service provider information technology systems to identify a first one of the different service provider information technology systems associated with the first device. In some examples, the respective instances of the second messaging include first data from the first messaging and conform to respective second sets of application programming interfaces, which are different from the first set of application programming interfaces and are specific to the respective ones of the different service provider information technology systems. Such disclosed example methods further include exchanging third messaging with the first one of the different service provider information technology systems to determine service offerings available for the first device.

In some such examples, the first set of application programming interfaces is agnostic to the respective ones of the different service provider information technology systems, and the third messaging conforms to a first one of the respective second sets of application programming interfaces specific to the first one of the different service provider information technology systems. Some such disclosed example methods also include transforming the third messaging to fourth messaging conforming to the first set of application programming interfaces, and exchanging the fourth messaging with the enterprise mobility service to convey the service offerings available for the first device to the enterprise mobility service.

In some examples, such methods further include transforming fifth messaging received from the enterprise mobility service and conforming to the first set of application programming interfaces to sixth messaging conforming to the first one of the respective second sets of application programming interfaces specific to the first one of the different service provider information technology systems, and exchanging the sixth messaging with the first one of the different service provider information technology systems to order at least one of the service offerings available for the first device. For example, the fifth messaging may include a first message conforming to a first application programming interface for selecting a first service to order from a listing of available service offerings, with the first application programming interface being included in the first set of application programming interfaces. Additionally or alternatively, in some such examples, the sixth messaging may include (1) a second message conforming to a second application programming interface for requesting the first one of the different service provider information technology systems to provision enterprise billing information associated with an ordered service, and (2) a third message conforming to a third application programming interface for requesting the first one of the different service provider information technology systems to provision subscriber billing information associated with the ordered service, with the second and third application programming interfaces being included in the first one of the respective second sets of application programming interfaces.

Additionally or alternatively, in some such disclosed example methods, the first data includes a device identifier identifying the first device. In some such disclosed example methods, the exchanging of the respective instances of the second messaging with the respective ones of the different service provider information technology systems involves including the device identifier in a first message conforming to an application programming interface for querying the first one of the different service provider information technology systems to qualify devices for service provisioning, with the application programming interface being included in the first one of the respective second sets of application programming interfaces specific to the first one of the different service provider information technology systems. Some such disclosed example methods also include transmitting the first message to the first one of the different service provider information technology systems. Some such disclosed example methods further include accessing a second message received from the first one of the different service provider information technology systems to determine whether the first one of the different service provider information technology is associated with the first device.

In some examples, such methods also include transmitting a third message including the device identifier to a second one of the different service provider information technology systems, with the third message conforming to a second application programming interface for querying the second one of the different service provider information technology systems to qualify devices for service provisioning, and the second application programming interface being included in a second one of the respective second sets of application programming interfaces specific to the second one of the service provider information technology systems. Some such disclosed example methods further include determining that the second one of the different service provider information technology systems is not associated with the first device when a fourth message received from the second one of the different service provider information technology systems indicates that the first device is not qualified for service provisioning, and determining that the first one of the different service provider information technology systems is associated with the first device when the second message received from the first one of the different service provider information technology systems indicates that the first device is qualified for service provisioning.

Additionally or alternatively, in some disclosed example methods, the first messaging mentioned above also identifies a second device. Some such disclosed example methods may further include exchanging respective instances of additional messaging with the respective ones of the different service provider information technology systems to identify a second one of the different service provider information technology systems associated with the second device, with the respective instances of the additional messaging conforming to the respective second sets of application programming interfaces that are specific to the respective ones of the different service provider information technology systems. Some such disclosed example methods may additionally include exchanging further messaging with the second one of the different service provider information technology systems to determine service offerings available for the second device.

Other example methods disclosed herein to adapt an enterprise mobility service (e.g., implemented by an enterprise mobility management system) to interface with different service provider information technology systems supporting service ordering include providing a set of application programming interfaces, which is service provider agnostic, to enable data to be communicated between the enterprise mobility service and the different service provider information technology systems. Such disclosed example methods also include invoking a first application programming interface from the set of application programming interfaces to communicate with an integrator that is to transform the data between the first application programming interface and respective second application programming interfaces specific to the different service provider information technology systems to enable the data to be communicated between the enterprise mobility service and the different service provider information technology systems.

In some such examples, the first application programming interface is a service provider agnostic application programming interface for adding device(s) to be managed by the enterprise mobility service and the second application programming interfaces are respective service provider specific application programming interfaces for accessing the respective service provider information technology systems to qualify the device(s) identified via the first application programming interface for service provisioning. In some examples, the first application programming interface is a service provider agnostic application programming interface for obtaining a catalog of available service offerings for an identified device, and the second application programming interfaces include a service provider specific application programming interface for accessing a particular one of the service provider information technology systems, which is determined to be associated with the identified device, to retrieve a list of available service offerings for the identified device. In some examples, the first application programming interface is a service provider agnostic application programming interface for ordering a selected service for an identified device, and the second application programming interfaces include a service provider specific application programming interface for accessing a particular one of the service provider information technology systems, which is determined to be associated with the identified device, to provision the selected service for the identified device. In some examples, the first application programming interface is a service provider agnostic application programming interface for requesting status (e.g., order/subscription status, usage metrics, etc.) for an identified device, and the second application programming interfaces include a service provider specific application programming interface for accessing a particular one of the service provider information technology systems, which is determined to be associated with the identified device, to access the requested status for the identified device.

In some such examples, the integrator also includes logic to simplify the interactions between the enterprise mobility service and the different service provider information technology systems. For example, the logic may respond to messaging conforming to a service provider agnostic application programming interface, which is for adding device(s) to be managed by the enterprise mobility service, by invoking service provider specific application programming interfaces for qualifying an identified device with the different service provider information technology systems to determine which one of the service provider information technology systems is associated with (e.g., provides services for) the identified device. The logic may then automatically invoke other application programming interfaces, which are specific to the particular service provider information technology system determined to be associated with the identified device, to access a listing of available services for the identified device. The logic may then automatically invoke another service provider agnostic application programming interface to report the listing of available services (possibly after aggregation and/or other filtering of the available services) to the enterprise mobility service.

These and other example methods, apparatus, systems and articles of manufacture (e.g., physical storage media) to interface with different service provider information technology systems supporting service ordering are disclosed in further detail below.

As mentioned above, enterprises having bring your own device (BYOD) policies generally would like to compensate employees for charges incurred when using their personal mobile devices for performing work functions. Many enterprises do this by offering stipends to their employees. However, such stipends may inaccurately reflect the real usage charges incurred by the employees. To truly cover work-related service (e.g., data and/or voice) expenses, enterprises would like to engage their employees' respective service providers (e.g., mobility carriers) to directly order and pay for work-related services used by employees' personal devices. However, there are no tools available today that make this exercise seamless from the enterprise's perspective.

Example methods, apparatus, systems and articles of manufacture (e.g., physical storage media) disclosed herein to interface enterprise mobility services with different service provider information technology systems supporting service ordering provide technical solutions to this technical problem by providing a platform that enables enterprises to order services (e.g., voice and/or data rate plans) for their employees via multiple service provider channels applicable across multiple mobility carriers. As disclosed in further detail below, such an example service ordering platform can be tied into the enterprise mobility services, such as the enterprise mobility management (EMM) systems, currently employed by enterprises to manage their mobility purchases. This allows enterprise administrators to use the third-party EMM systems with which they are familiar, rather than being required to access and use different, service provider specific information technology (IT) systems, such as the different mobility management platforms (MMPs) implemented by the respective operations support systems/business support systems (referred to herein as OSS/BSS) of the different service providers, to order and manage services for the personal devices used by their employees.

As disclosed in further detail below, some example service ordering platforms disclosed herein tie an enterprise EMM system into one or more integrator systems using a set of service provider agnostic application programming interfaces (APIs), also referred to herein as northbound APIs. These northbound APIs provide a standardized way of representing mobility services (e.g., voice plans, data plans, etc.) across different service providers (e.g., mobility carriers), thereby allowing an EMM system supporting the northbound APIs to access the integrator system(s) to order and manage employee voice and data plans across different mobility carriers. The integrator system(s), in turn, are responsible for interfacing with the different service provider IT systems (e.g., OSS/BSS) provided by the different service providers (e.g., mobility carriers) for service ordering using set(s) of service provider specific APIs, referred to as southbound APIs. The southbound APIs allow the integrator systems(s) to access these different service provider IT systems provided by the different service providers to perform operations such as user/device qualification, product ordering and management, etc., with the specific provider(s) (e.g., mobility carrier(s)) with which the enterprise employees are subscribers.

Turning to the figures, a block diagram of an example system 100 to interface one or more example enterprise mobility services (e.g., EMM systems) with multiple different service provider IT systems (e.g., OSS/BSS) supporting service ordering in accordance with the teachings of this disclosure is illustrated in FIG. 1. The example system 100 includes example enterprise mobility services 105A-D to manage mobile devices, networks and associated services for one or more enterprises (e.g., one or more companies, associations, businesses, groups, etc.). The example enterprise mobility services 105A-D may be implemented by, for example, respective enterprise mobility management (EMM) systems operated by enterprise administrators. EMM systems are typically provided by third-parties, different from the service provider(s) providing the actual mobility services for the mobile devices being managed by the enterprise. Example EMM systems that may be used to implement the example enterprise mobility services 105A-D include, but are not limited to, EMM systems provided by Good Technology®, MobileIron®, AirWatch®, OpenPeak®, Soti®, XenMobile®, etc.

In some examples, the EMM systems used to implement the enterprise mobility services 105A-D are implemented by EMM application software executed by one or more servers, processors, etc., such as, but not limited to, the example processor platform 1400 of FIG. 14, which is described in further detail below. In the illustrated example of FIG. 1, the EMM systems used to implement the enterprise mobility services 105A-D support enterprise BYOD policies by managing enterprise network security and mobile device application access. For example, the EMM systems implementing the enterprise mobility services 105A-D can manage access by employee mobile devices to an enterprise network by configuring and downloading security credentials to the employee mobile devices, managing processing of the security credentials by relevant network elements, etc. The EMM systems implementing the example enterprise mobility services 105A-D can manage mobile device application access by configuring which enterprise application(s) (e.g., such as purchasing applications, timekeeping applications, directories, etc.) are permitted to be accessed by the employee mobile devices. The mobile devices managed by the EMM systems implementing the enterprise mobility services 105A-D can correspond to any type(s) and/or number(s) of mobile devices or computing devices, in general, such as, but not limited to mobile smartphones, mobile telephones, personal digital assistants, etc.

Additionally or alternatively, the EMM systems implementing the example enterprise mobility services 105A-D manage financial aspects related to the enterprise BYOD policies. Such financial aspects include compensating employees for charges incurred when using their personal mobile devices for performing work functions. For example, and as disclosed in further detail, the EMM systems implementing the example enterprise mobility services 105A-D are adapted in accordance with the teachings of this disclosure to interface with example service provider IT systems 110A-C to order and manage services (e.g., voice and/or data plans) for employee mobile devices. Unlike prior EMM systems that rely on stipends to compensate employees, the EMM systems implementing the example enterprise mobility services 105A-D are able to interface with the service provider IT systems of the different service providers providing mobility services for their employees' mobile devices to order services for the employee mobile devices that can be billed directly to the enterprise, thereby providing accurate compensation to the enterprise's employees.

In the illustrated example of FIG. 1, the example service provider IT systems 110A-C support service ordering to different respective service providers. For example, the service provider IT systems 110A-C may correspond to respective OSS/BSS used by respective telecommunication providers, such as AT&T®, Verizon®, TMobile®, Sprint®, etc., to support mobile device management, also referred to as mobility management. OSS include computer systems to manage the technical operation of a service provider's network by implementing features such as, but not limited to, network inventory management, network configuration management, service provisioning, fault management, etc. BSS include computer systems to manage business aspects for a service provider by implementing features such as, but not limited to, product/service management, customer management, order management, etc.

In the illustrated example of FIG. 1, the different service provider IT systems 110A-C provide sets of application programming interfaces (APIs) which may be used to access the service provider IT systems 110A-C to perform operations related to mobile device management. For example, an API may be provided to qualify devices to determine whether a device is associated with or, in other words, is served by a particular service provider and, if so, whether the device (or a user/subscriber associated with the device) is qualified to receive new/additional/different services. Other APIs may be provided to provide of listing (e.g., catalog) of services available for a given device and to order a selected service. Still other APIs may support different reporting functionality for mobile device management. In some examples, the sets of APIs provided by the different service provider IT systems 110A-C are service provider specific.

As such, the respective sets of APIs for different service provider IT systems 110A-C may be incompatible because each set may be tailored to the specific capabilities, requirements, etc., of the different OSS/BSS implementing the respective service provider IT systems 110A-C.

Accordingly, the example system 100 of FIG. 1 includes one or more example integrator systems 115A-B implemented in accordance with the teachings of this disclosure to provide a service ordering platform capable of interfacing a given one of the example enterprise mobility services 105A-D with the multiple, different service provider IT systems 110A-C to support service ordering and management for mobile devices managed by the given example enterprise mobility service 105A-D. In some examples, the integrator systems 115A-B are provided by a third-party different from the enterprises associated with the example enterprise mobility services 105A-D and different from the service providers associated with the service provider IT systems 110A-C. In the example system 100 of FIG. 1, the enterprise mobility services 105A-D are in communication with the example integrator system(s) 115A-B via an example network 120, and the example service provider IT systems 110A-C are in communication with the example integrator system(s) 115A-B via an example network 125. The example networks 120 and 125 may be implemented any type(s) and/or number(s) of networks, such as, but not limited to, one or more wired (e.g., broadband) networks, one or more wireless (e.g., cellular, satellite, etc.) networks, the Internet, etc. Also, the example networks 120 and 125 may correspond to different networks or the same network.

As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

To interface a given one of the example enterprise mobility services 105A-D with the multiple, different service provider IT systems 110A-C to support service ordering for mobile devices and related device management, the example integrator system(s) 115A-B implements a set of service provider agnostic APIs, also referred to herein as northbound APIs, for interfacing with the example enterprise mobility services 105A-D, and sets of service provider specific APIs, also referred to herein as southbound APIs, for interfacing with the service provider IT systems 110A-C. In the illustrated example, the set of northbound APIs implemented by the example integrator system(s) 115A-B is service provider agnostic because it is not tailored to and, thus, is independent from any specific service provider. Instead, the set of northbound APIs provide a standardized way of representing mobility services (e.g., voice plans, data plans, etc.) across different service providers (e.g., mobility carriers), thereby allowing the example enterprise mobility services 105A-D supporting the northbound APIs to access the integrator system(s) using a common, standardized interface to order and manage services for employee mobile device across different service providers. In the illustrated example, the different sets of southbound APIs implemented by the example integrator system(s) 115A-B, in contrast, are service provider specific because each respective set of southbound APIs is tailored to a specific service provider. As such, different sets of southbound APIs for different service providers may be incompatible with each other. Example sets of northbound and southbound APIs capable of being implemented by the example integrator system(s) 115A-B are described in further detail below.

In addition to implementing the sets of northbound and southbound APIs, the example integrator system(s) 115A-B include logic to transform messaging (e.g., in the form of one or more messages and/or any other form of communication for exchanging data among two or more machines, computing devices, etc.) conforming to the set of northbound APIs to messaging (e.g., in the form of one or more messages and/or any other form of communication for exchanging data among two or more machines, computing devices, etc.) conforming to a particular one of the sets of southbound APIs, and vice versa. In some examples, the integrator system(s) 115A-B include further logic to automatically invoke combinations of APIs to simplify the interactions between the example enterprise mobility services 105A-D and the integrator system(s) 115A-B. Examples of such logic are described in further detail below.

Although the example system 100 is depicted as including four (4) example enterprise mobility services 105A-D, three (3) example service provider IT systems 110A-C and two (2) example integrator system(s) 115A-B, the interfacing of enterprise mobility services with service provider IT systems in accordance with the teachings of this disclosure is not limited thereto. On the contrary, the system 100 could include any number of enterprise mobility services 105A-D, any number of service provider IT systems 110A-C and/or any number of integrator system(s) 115A-B. Furthermore, although the example enterprise mobility services 105A-D have been described as being implemented by respective EMM systems, the interfacing of enterprise mobility services with service provider IT systems in accordance with the teachings of this disclosure is not limited thereto. On the contrary, one or more of the enterprise mobility services 105A-D could be implemented by any systems, applications, devices, etc., capable of supporting mobility management.

Figure 2:
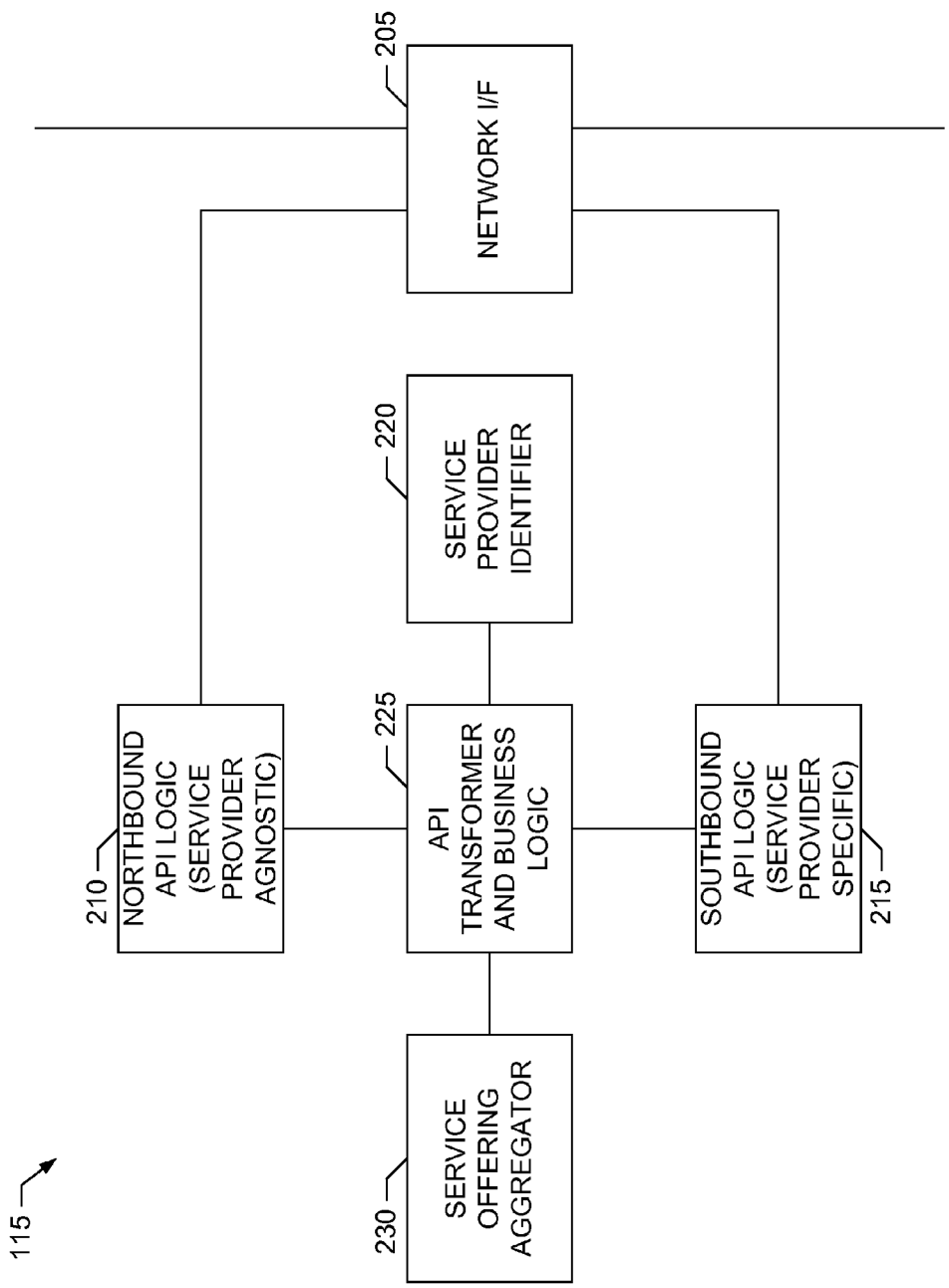
FIG. 2 is a block diagram of an example integrator system that may be used to implement the example system of FIG. 1.

A block diagram of an example integrator system 115 that may be used to implement one or more of the example integrator systems 115A-B of FIG. 1 is illustrated in FIG. 2. The example integrator system 115 of FIG. 2 includes an example network interface 205 to connect to one or more communication networks, links, etc., such as the example networks 120 and/or 125 of FIG. 1. The example network interface 205 can be implemented by any type(s), number(s) and/or combination(s) of interfaces, such as the example interface circuit 1320 of FIG. 13, which is described in further detail below.

The example integrator system 115 of FIG. 2 also includes example northbound API logic 210 to implement a set of northbound APIs to format and exchange messaging for interfacing with enterprise mobility services, such as the example enterprise mobility services 105A-D of FIG. 1. In the illustrated example of FIG. 2, the set of northbound APIs implemented by the northbound API logic 210 is service provider agnostic. The example integrator system 115 of FIG. 2 further includes example southbound API logic 215 to implement respective sets of southbound APIs to format and exchange messaging for interfacing with respective different service provider IT systems, such as the example service provider IT systems 110A-C of FIG. 1. In the illustrated example of FIG. 2, the sets of southbound APIs implemented by the southbound API logic 215 are service provider specific.

In some examples, the set of northbound APIs implemented by the northbound API logic 210 includes service provider agnostic APIs to add users and add devices, which allow an enterprise mobility service, such as one of the example enterprise mobility services 105A-D of FIG. 1, to identify the employees (subscribers) and/or devices for which an enterprise wishes to order/manage mobility services (e.g., voice and/or data plans). Example northbound APIs also include APIs to present a service catalog, and order selected data service(s) and/or voice service(s) from such a catalog, which allow the integrator system 115 to present the mobility solutions offered by the integrator for a particular device/user, and to receive order selections from the enterprise mobility service. Example northbound APIs further include reporting capability APIs to allow the enterprise mobility service to configure and receive information from the integrator system 115 regarding subscription/order status, usage metrics, endpoints for which reporting is to be performed, etc.

In some examples, the sets of southbound APIs implemented by the example southbound API logic 215 include service provider specific versions of the northbound APIs. For example, southbound APIs may include APIs to qualify subscribers and/or devices to, for example, allow the integrator system 115 to query different service provider IT systems (e.g., such as the service provider IT systems 110A-C of FIG. 1) associated with different service providers (e.g., different mobility carriers) to determine which service provider is servicing a particular user and/or device identified via the northbound APIs. The southbound APIs to qualify subscribers and/or devices may also be used to determine whether a given user/device is valid (e.g., has a valid subscription), is under collections, etc. Example southbound APIs also includes APIs to interface with the service provider IT systems associated with different service provider to identify relevant service offerings available from the different service providers for identified devices. Example southbound APIs further include APIs to interface with the service provider IT systems associated with different service providers to provision enterprise and consumer (e.g., employee) billing, such that the appropriate billing entries appear on the enterprises' vs. employees' bills. Example southbound APIs also include APIs to interface with the service provider IT systems associated with different service provider to support reporting capabilities specific to the different service provider IT systems.

Figure 3:
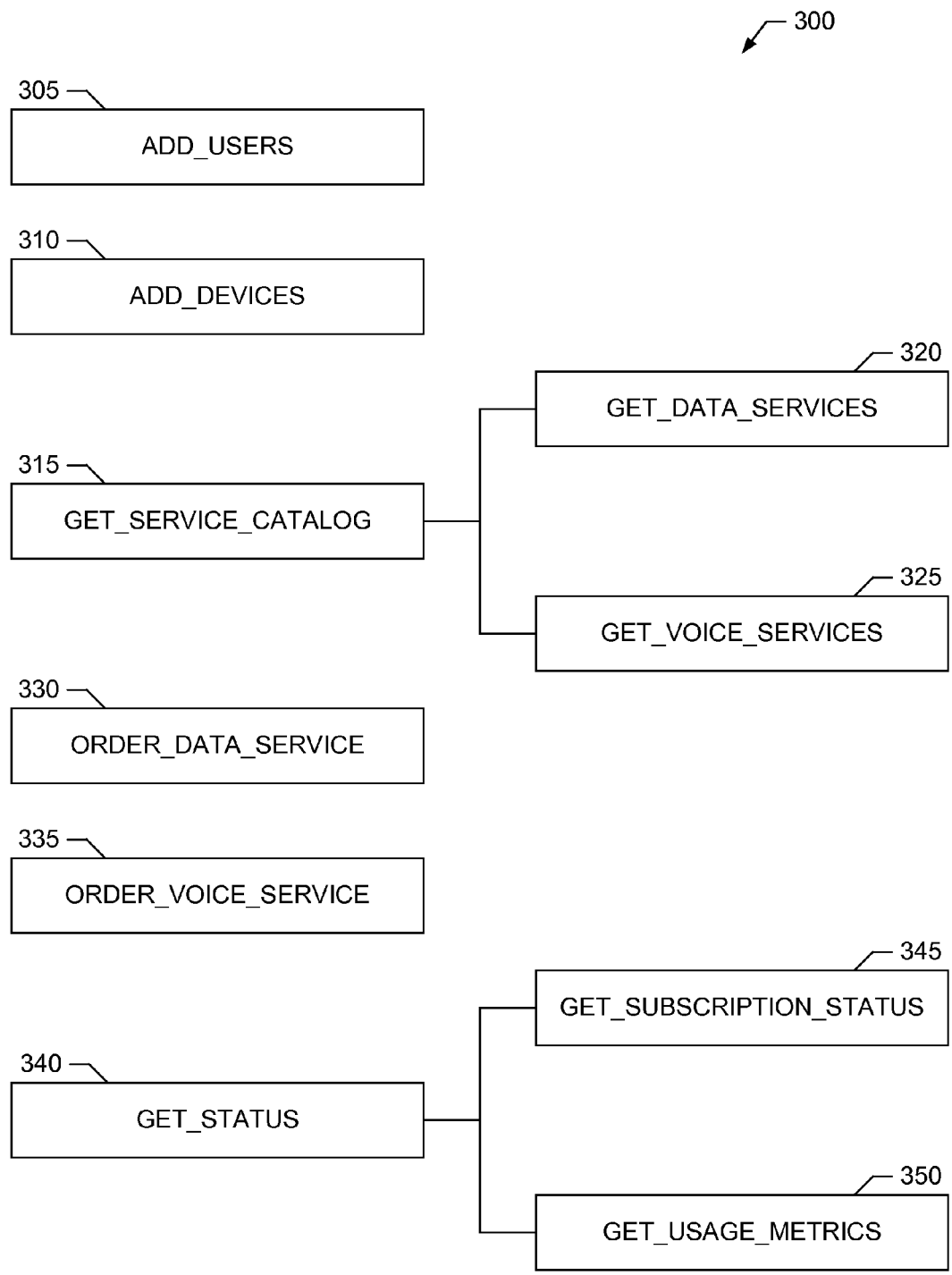
FIG. 3 illustrates an example set of service provider agnostic northbound application programming interfaces that may be implemented by the example integrator system(s) of FIGS. 1 and/or 2.

FIG. 3 illustrates a more detailed example set of northbound APIs 300 capable of being implemented by the example northbound API logic 210 of FIG. 2. The example northbound APIs 300 include an example ADD_USERS API 305 to exchange messaging specifying a list of users to be managed by an enterprise mobility service. In some examples, the ADD_USERS API 305 includes an enterprise-side component to be implemented by an enterprise mobility service to accept a list of user identifiers specifying the list of users to be managed by an enterprise mobility service, and to format the list for inclusion in messaging to be transmitted to an integrator system. The user identifiers may correspond to service provider user identifiers (e.g., account identifiers, usernames, etc.) used by the respective service providers to identify the users specified in the list. In some such examples, the ADD_USERS API 305 includes an integrator-side component to be implemented by the example northbound API logic 210 of FIG. 2 to process received messaging to extract the list of user identifiers. In some examples, the ADD_USERS API 305 further supports exchanging one or more flags, indicators, etc., to indicate whether the users specified by the exchanged list are to be added or removed from the set of users being managed by the enterprise mobility service.

Additionally or alternatively, the example northbound APIs 300 include an example ADD_DEVICES API 310 to exchange messaging specifying a list of devices to be managed by an enterprise mobility service. In some examples, the ADD_DEVICES API 310 includes an enterprise-side component to be implemented by an enterprise mobility service to accept a list of device identifiers specifying the list of devices to be managed by an enterprise mobility service, and to format the list for inclusion in messaging to be transmitted to an integrator system. The device identifiers may correspond to service provider device identifiers (e.g., phone numbers, network addresses, etc.) used by the respective service providers to identify the devices specified in the list. In some such examples, the ADD_DEVICES API 310 includes an integrator-side component to be implemented by the example northbound API logic 210 of FIG. 2 to process received messaging to extract the list of device identifiers. In some examples, the ADD_DEVICES API 310 further supports exchanging one or more flags, indicators, etc., to indicate whether the devices specified by the exchanged list are to be added or removed from the set of devices being managed by the enterprise mobility service.

In the illustrated example of FIG. 3, the example northbound APIs 300 also include an example GET_SERVICE_CATALOG API 315, which further includes an example GET_DATA_SERVICES API 320 and an example GET_VOICE_SERVICES API 325. For example, use of the GET_SERVICE_CATALOG API 315 can automatically invoke usage of the GET_DATA_SERVICES API 320 and the GET_VOICE_SERVICES API 325 to obtain lists of data and voice services that are available for an identified device and/or user. In some examples, the GET_DATA_SERVICES API 320 and the GET_VOICE_SERVICES API 325 can be invoked individually to obtain just a list of data services available for an identified device and/or user, or just a list of voice services available for an identified device and/or user, respectively.

In some examples, the GET_SERVICE_CATALOG API 315 includes an enterprise-side component to be implemented by an enterprise mobility service to accept a device identifier (e.g., a phone number, a network address, etc.) and/or a user identifier (e.g., an account identifier, a username, etc.) identifying a device and/or user for which a catalog of available services is to be obtained, and to format (or invoke the GET_DATA_SERVICES API 320 and the GET_VOICE_SERVICES API 325 to format) this information in messaging to be transmitted to an integrator system. In some such examples, the enterprise-side component of the GET_SERVICE_CATALOG API 315 is also to process received messaging (or the results provided by the GET_DATA_SERVICES API 320 and the GET_VOICE_SERVICES API 325) to extract a list of services available for the device and/or user identified by the specified device identifier and/or user identifier. In some examples, the GET_SERVICE_CATALOG API 315 includes an integrator-side component to be implemented by the example northbound API logic 210 of FIG. 2 to process received messaging to extract the device identifier and/or user identifier identifying the device and/or user for which the catalog of available services is to be obtained. In some such examples, the integrator-side component of the GET_SERVICE_CATALOG API 315 is also to accept list(s) of available services obtained by accessing the appropriate service provider IT system(s) (e.g., the system(s) 110A-C) associated with the identified user/device, and to format the list(s) for inclusion in messaging to be returned to a requesting enterprise mobility service.

In some examples, the GET_DATA_SERVICES API 320 and the GET_VOICE_SERVICES API 325 include respective enterprise-side and integrator-side components to implement similar functionality as for the GET_SERVICE_CATALOG API 315, but focused on obtaining list(s) of available data services or list(s) of available voice services, respectively, for an identified user and/or device.

The example northbound APIs 300 of FIG. 3 further include an example ORDER_DATA_SERVICE API 330 and an example ORDER_VOICE_SERVICE API 335 to order data and voice service(s), respectively, for an identified user and/or device. In some examples, the ORDER_DATA_SERVICE API 330 includes an enterprise-side component to be implemented by an enterprise mobility service to accept a device identifier (e.g., a phone number, a network address, etc.) and/or a user identifier (e.g., an account identifier, a username, etc.) identifying a device and/or user for which a selected data service (e.g., selected from the catalog obtained via the GET_SERVICE_CATALOG API 315 and/or GET_DATA_SERVICES API 320) is to be ordered. The enterprise-side component in such examples also accepts information identifying the selected data service, and formats the user/device identifier(s) and order selection information in messaging to be transmitted to an integrator system. In some such examples, the ORDER_DATA_SERVICE API 330 includes an integrator-side component to be implemented by the example northbound API logic 210 of FIG. 2 to process received messaging to extract the device identifier and/or user identifier identifying the device and/or user for which a selected data service is to be ordered. The integrator-side component in such examples also extracts the order selection information from the received messaging.

In some examples, the ORDER_VOICE_SERVICE API 335 similarly includes an enterprise-side component to be implemented by an enterprise mobility service to accept a device identifier (e.g., a phone number, a network address, etc.) and/or a user identifier (e.g., an account identifier, a username, etc.) identifying a device and/or user for which a selected voice service (e.g., selected from the catalog obtained via the GET_SERVICE_CATALOG API 315 and/or GET_VOICE_SERVICES API 325) is to be ordered. The enterprise-side component in such examples also accepts information identifying the selected voice service, and formats the user/device identifier(s) and order selection information in messaging to be transmitted to an integrator system. In some such examples, the ORDER_VOICE_SERVICE API 335 includes an integrator-side component to be implemented by the example northbound API logic 210 of FIG. 2 to process received messaging to extract the device identifier and/or user identifier identifying the device and/or user for which a selected voice service is to be ordered. The integrator-side component in such examples also extracts the order selection information from the received messaging.

In the illustrated example of FIG. 3, the example northbound APIs 300 also include an example GET_STATUS API 340, which further includes an example GET_SUBSCRIPTION_STATUS API 345 and an example GET_USAGE_METRICS API 350. For example, use of the GET_STATUS API 340 can automatically invoke usage of the GET_SUBSCRIPTION_STATUS API 345 and the GET_USAGE_METRICS API 350 to obtain information concerning status of a subscription (e.g., status of an order that was placed, information indicating whether the user's subscription is up-to-date or in collections, etc.) and usage metrics (e.g., data usage, data remaining in the current subscription cycle, voice minutes used, voice minutes remaining, etc.), respectively, for an identified device and/or user. In some examples, the GET_SUBSCRIPTION_STATUS API 345 and the GET_USAGE_METRICS API 350 can be invoked individually to obtain just the subscription status for an identified device and/or user, or just the usage metrics an identified device and/or user, respectively.

In some examples, the GET_STATUS API 340 includes an enterprise-side component to be implemented by an enterprise mobility service to accept a device identifier (e.g., a phone number, a network address, etc.) and/or a user identifier (e.g., an account identifier, a username, etc.) identifying a device and/or user for which status is to be obtained, and to format (or invoke the GET_SUBSCRIPTION_STATUS API 345 and the GET_USAGE_METRICS API 350 to format) this information in messaging to be transmitted to an integrator system. In some such examples, the enterprise-side component of the GET_STATUS API 340 is also to process received messaging (or the results provided by the GET_SUBSCRIPTION_STATUS API 345 and the GET_USAGE_METRICS API 350) to extract status information returned for the device and/or user identified by the specified device identifier and/or user identifier. In some examples, the GET_STATUS API 340 includes an integrator-side component to be implemented by the example northbound API logic 210 of FIG. 2 to process received messaging to extract the device identifier and/or user identifier identifying the device and/or user for which status is to be obtained. In some such examples, the integrator-side component of the GET_STATUS API 340 is also to accept subscription status information and/or usage metrics information obtained by accessing the appropriate service provider IT system(s) (e.g., the system(s) 110A-C) associated with the identified user/device, and to format the information for inclusion in messaging to be returned to a requesting enterprise mobility service.

In some examples, the GET_SUBSCRIPTION_STATUS API 345 and the GET_USAGE_METRICS API 350 include respective enterprise-side and integrator-side components to implement similar functionality as for the GET_STATUS API 340, but focused on obtaining subscription status information or usage metrics information, respectively, for an identified user and/or device.

In some examples, the respective APIs included in the example set of northbound APIs 300 are associated with respective API identifiers that can be included in messaging to indicate to which API the messaging conforms. In some examples, the example set of northbound APIs 300 can be implemented by software development kits (SDKs) capable of being integrated with applications executing on the servers, computing devices, hardware, etc., implementing the enterprise mobility services (e.g., the example enterprise mobility services 105A-D), implementing the example integrator system 115 of FIG. 2, etc.

Figure 4:
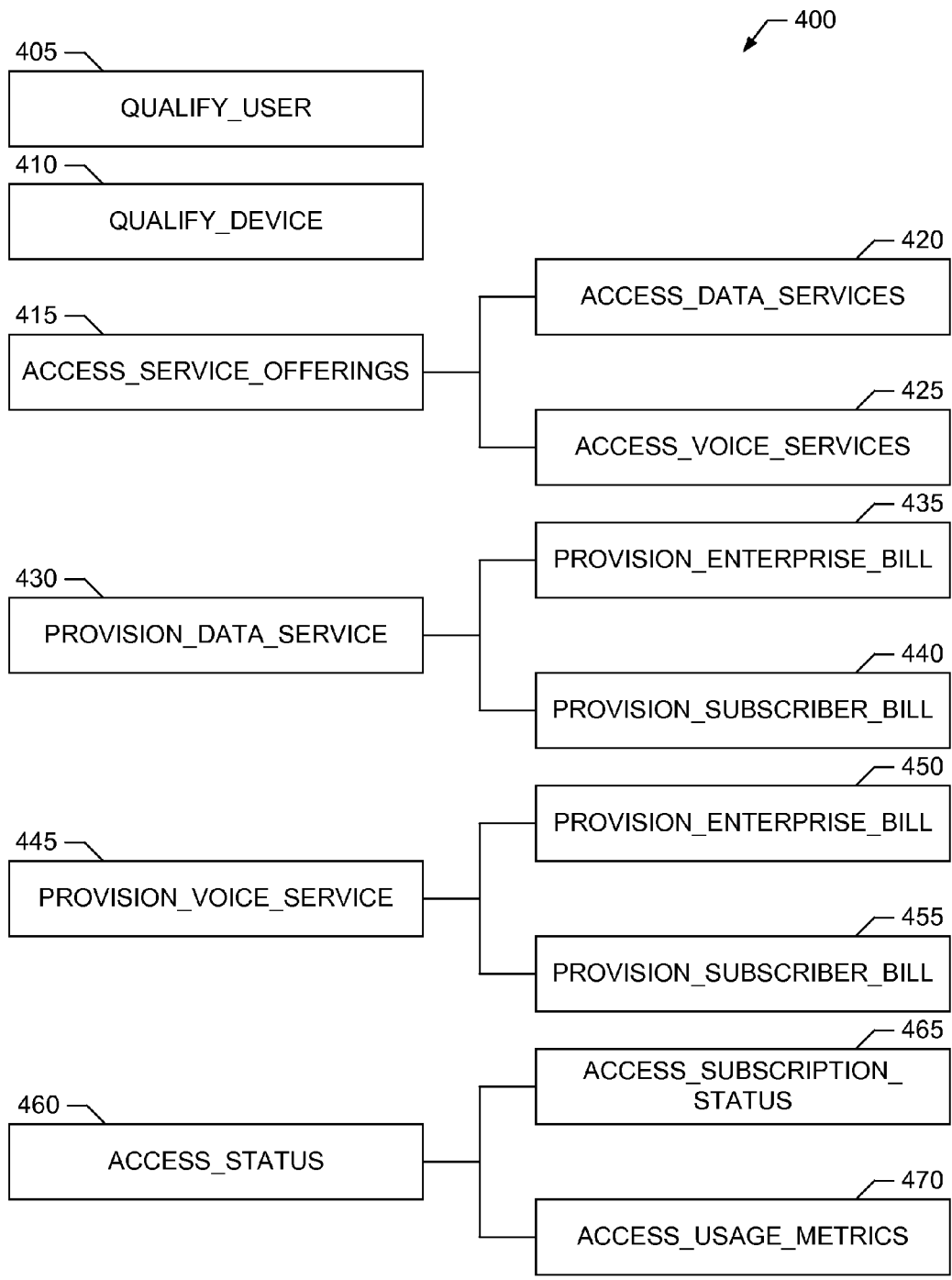
FIG. 4 illustrates an example set of service provider specific southbound application programming interfaces that may be implemented by the example integrator system(s) of FIGS. 1 and/or 2.

FIG. 4 illustrates a more detailed example set of southbound APIs 400 capable of being implemented by the example southbound API logic 215 of FIG. 2. In some examples, the southbound API logic 215 implements multiple instances of the set of southbound APIs 400, with each different instance being a respective set of southbound APIs 400 specific to a respective service provider IT system 110A-C. The example southbound APIs 400 include an example QUALIFY_USERS API 405 to exchange messaging with a particular service provider IT system to determine whether an identified user is associated with the particular service provider IT system and qualified for receiving additional services. In some such examples, the QUALIFY_USERS API 405 accepts a user identifier (e.g., an account identifier, a username, etc.) and formats the user identifier into messaging capable of being received and processed by the particular service provider IT system. The QUALIFY_USERS API 405 in some such examples also processes messaging received from the particular service provider IT system to extract a qualification result returned by the particular service provider IT system. In some examples, the qualification result can be success (e.g., indicating the identified user is qualified to receive additional services), failure (e.g., indicating the identified user is not permitted to receive additional services, which may be the case when the user's subscription is suspended, in collections, etc.), unknown (e.g., indicating the identified user is not associated with the particular service provider IT system, which may be the case when the user does not have a subscription with the particular service provider IT system), etc.

Additionally or alternatively, the example southbound APIs 400 include an example QUALIFY_DEVICES API 410 to exchange messaging with a particular service provider IT system to determine whether an identified device is associated with the particular service provider IT system and qualified for receiving additional services. In some such examples, the QUALIFY_DEVICES API 410 accepts a device identifier (e.g., a phone number, a network address, etc.) and formats the device identifier into messaging capable of being received and processed by the particular service provider IT system. The QUALIFY_DEVICES API 410 in some such examples also processes messaging received from the particular service provider IT system to extract a qualification result returned by the particular service provider IT system. In some examples, the qualification result can be success (e.g., indicating the identified device is qualified to receive additional services), failure (e.g., indicating the identified device is not permitted to receive additional services, which may be the case when a subscription associated with the device is suspended, in collections, etc.), unknown (e.g., indicating the identified device is not associated with the particular service provider IT system, which may be the case when the device is not associated with any subscription of the particular service provider IT system), etc.

In the illustrated example of FIG. 4, the example southbound APIs 400 also include an example ACCESS_SERVICE_OFFERINGS API 415, which further includes an example ACCESS_DATA_SERVICES API 420 and an example ACCESS_VOICE_SERVICES API 425. For example, use of the ACCESS_SERVICE_OFFERINGS API 415 can automatically invoke usage of the ACCESS_DATA_SERVICES API 420 and the ACCESS_VOICE_SERVICES API 425 to access a particular service provider IT system to determine the data and voice services that are available for an identified device and/or user. In some examples, the ACCESS_DATA_SERVICES API 420 and the ACCESS_VOICE_SERVICES API 425 can be invoked individually to access just the data services available for an identified device and/or user, or just the voice services available for an identified device and/or user, respectively.

In some examples, the ACCESS_SERVICE_OFFERINGS API 415 accepts a device identifier (e.g., a phone number, a network address, etc.) and/or a user identifier (e.g., an account identifier, a username, etc.) identifying a device and/or user for which available services is to be obtained, and formats (or invoke the ACCESS_DATA_SERVICES API 420 and the ACCESS_VOICE_SERVICES API 425 to format) this information in messaging capable of being received and processed by the particular service provider IT system. In some such examples, the ACCESS_SERVICE_OFFERINGS API 415 is also to process messaging received from the particular service provider IT system (or the results provided by the ACCESS_DATA_SERVICES API 420 and the ACCESS_VOICE_SERVICES API 425) to extract information (e.g., list(s) or other data constructs) indicating the services available for the device and/or user identified by the specified device identifier and/or user identifier. In some examples, the ACCESS_DATA_SERVICES API 420 and ACCESS_VOICE_SERVICES API 425 include similar functionality as for the ACCESS_SERVICE_OFFERINGS API 415, but focused on obtaining list(s) of available data services or list(s) of available voice services, respectively, for an identified user and/or device.

The example southbound APIs 400 of FIG. 4 further include an example PROVISION_DATA_SERVICE API 430 to provision data service(s) for an identified user and/or device. In some examples, the PROVISION_DATA_SERVICE API 430 accepts a device identifier (e.g., a phone number, a network address, etc.) and/or a user identifier (e.g., an account identifier, a username, etc.) identifying a device and/or user for which a selected data service (e.g., selected from the list(s) obtained via the ACCESS_SERVICE_OFFERINGS API 415 and/or ACCESS_DATA_SERVICES API 420) is to be provisioned by a particular service provider IT system. The PROVISION_DATA_SERVICE API 430 in such examples also accepts information identifying the selected data service, and formats the user/device identifier(s) and order selection information in messaging capable of being received and processed by the particular service provider IT system. In some such examples, the PROVISION_DATA_SERVICE API 430 further includes an example PROVISION_ENTERPRISE_BILL API 435 and an example PROVISION_SUBSCRIBER_BILL API 440 to format messaging capable of being received and processed by the particular service provider IT system to provision appropriate billing entries for the provisioned data service(s) on an enterprise's bill and a subscriber's (e.g., employee's) bill, respectively.

Additionally or alternatively, the example southbound APIs 400 of FIG. 4 include an example PROVISION_VOICE_SERVICE API 445 to provision voice service(s) for an identified user and/or device. In some examples, the PROVISION_VOICE_SERVICE API 445 accepts a device identifier (e.g., a phone number, a network address, etc.) and/or a user identifier (e.g., an account identifier, a username, etc.) identifying a device and/or user for which a selected voice service (e.g., selected from the list(s) obtained via the ACCESS_SERVICE_OFFERINGS API 415 and/or ACCESS_VOICE_SERVICES API 425) is to be provisioned by a particular service provider IT system. The PROVISION_VOICE_SERVICE API 445 in such examples also accepts information identifying the selected voice service, and formats the user/device identifier(s) and order selection information in messaging capable of being received and processed by the particular service provider IT system. In some such examples, the PROVISION_VOICE_SERVICE API 445 further includes an example PROVISION_ENTERPRISE_BILL API 450 and an example PROVISION_SUBSCRIBER_BILL API 455 to format messaging capable of being received and processed by the particular service provider IT system to provision appropriate billing entries for the provisioned voice service(s) on an enterprise's bill and a subscriber's (e.g., employee's) bill, respectively.

In the illustrated example of FIG. 4, the example southbound APIs 400 also include an example ACCESS_STATUS API 460, which further includes an example ACCESS_SUBSCRIPTION_STATUS API 465 and an example ACCESS_USAGE_METRICS API 470. For example, use of the ACCESS_STATUS API 460 can automatically invoke usage of the ACCESS_SUBSCRIPTION_STATUS API 465 and the ACCESS_USAGE_METRICS API 470 to access a particular service provider IT system to retrieve information concerning status of a subscription (e.g., status of an order that was placed, information indicating whether the user's subscription is up-to-date or in collections, etc.) and usage metrics (e.g., data usage, data remaining in the current subscription cycle, voice minutes used, voice minutes remaining, etc.), respectively, for an identified device and/or user. In some examples, the ACCESS_SUBSCRIPTION_STATUS API 465 and the ACCESS_USAGE_METRICS API 470 can be invoked individually to access the particular service provider IT system to retrieve just the subscription status for an identified device and/or user, or just the usage metrics an identified device and/or user, respectively.

In some examples, the ACCESS_STATUS API 460 accepts a device identifier (e.g., a phone number, a network address, etc.) and/or a user identifier (e.g., an account identifier, a username, etc.) identifying a device and/or user for which status is to be retrieved. In some such examples, the ACCESS_STATUS API 460 also formats (or invokes the ACCESS_SUBSCRIPTION_STATUS API 465 and the ACCESS_USAGE_METRICS API 470 to format) this information in messaging capable of being received and processed by the particular service provider IT system. In some such examples, the ACCESS_STATUS API 460 is also to process messaging received from the particular service provider IT system (or the results provided by the ACCESS_SUBSCRIPTION_STATUS API 465 and the ACCESS_USAGE_METRICS API 470) to extract status information returned for the device and/or user identified by the specified device identifier and/or user identifier.

In some examples, the ACCESS_SUBSCRIPTION_STATUS API 465 and the ACCESS_USAGE_METRICS API 470 include implement similar functionality as for the ACCESS_STATUS API 460, but focused on retrieving subscription status information or usage metrics information, respectively, for an identified user and/or device.

In some examples, the respective APIs included in the example set of southbound APIs 400 are associated with respective API identifiers that can be included in messaging to indicate to which API the messaging conforms. In some examples, respective sets of the southbound APIs 400 corresponding to respective, different service provider IT systems (e.g., the different service provider IT systems 110A-C) can be implemented by respective SDKs capable of being integrated with applications executing on the servers, computing devices, hardware, etc., implementing the example integrator system 115 of FIG. 2.

Returning to FIG. 2, the example integrator system 115 includes an example service provider identifier 220 to identify service providers associated with (e.g., providing services for) devices to be managed by an enterprise mobility service (e.g., one or more of the services 105A-D) in communication with the example integrator system 115. In some such examples, the service provider identifier 220 invokes the example northbound API logic 210 to receive and extract a list of device identifiers from received messaging conforming to an ADD_DEVICES API 310 implemented by the northbound API logic 210. In some such examples, for a given device identifier included in the extracted list of device identifiers, the service provider identifier 220 invokes the example southbound API logic 215 to prepare and transmit respective instances of messaging conforming to different QUALIFY_DEVICES APIs 410 implemented by the southbound API logic 215 for different respective service provider IT systems to determine which one of the different service provider IT systems is associated with the given device identifier.

For example, the service provider identifier 220 may invoke a first QUALIFY_DEVICES API 410 corresponding to a first service provider IT system to send first messaging to the first service provider IT system to attempt to qualify the device associated with the given device identifier with the first service provider IT system. If responsive messaging from the first service provider IT system indicates that qualification of the device associated with the given device identifier was successful, the service provider identifier 220 determines that the first service provider IT system is associated with the device associated with the given device identifier. However, if qualification of the device was unsuccessful, the service provider identifier 220 may invoke a second QUALIFY_DEVICES API 410 corresponding to a second service provider IT system to send second messaging to the second service provider IT system to attempt to qualify the device associated with the given device identifier with the second service provider IT system. If responsive messaging from the second service provider IT system indicates that qualification of the device associated with the given device identifier was successful, the service provider identifier 220 determines that the second service provider IT system is associated with the device associated with the given device identifier. However, if qualification of the device was unsuccessful, the service provider identifier 220 may continue to invoke other QUALIFY_DEVICES APIs 410 corresponding to other service provider IT systems until a successful qualification result is received, or all service provider IT systems have been queried.

In some examples, the service provider identifier 220 identifies service providers associated with (e.g., providing services for) users (e.g., employees) to be managed by an enterprise mobility service (e.g., one or more of the services 105A-D) in communication with the example integrator system 115. In some such examples, the service provider identifier 220 invokes the example northbound API logic 210 to receive and extract a list of user identifiers from messaging conforming to an ADD_USERS API 305 implemented by the northbound API logic 210. In some such examples, for a given user identifier included in the extracted list of user identifiers, the service provider identifier 220 invokes the example southbound API logic 215 to prepare and transmit respective instances of messaging conforming to different QUALIFY_USER APIs 405 implemented by the southbound API logic 215 for different respective service provider IT systems to determine which one of the different service provider IT systems is associated with the given user identifier.

For example, the service provider identifier 220 may invoke a first QUALIFY_USERS API 405 corresponding to a first service provider IT system to send first messaging to the first service provider IT system to attempt to qualify the user associated with the given user identifier with the first service provider IT system. If responsive messaging from the first service provider IT system indicates that qualification of the user associated with the given user identifier was successful, the service provider identifier 220 determines that the first service provider IT system is associated with the user associated with the given user identifier. However, if qualification of the user was unsuccessful, the service provider identifier 220 may invoke a second QUALIFY_USERS API 405 corresponding to a second service provider IT system to send second messaging to the second service provider IT system to attempt to qualify the user associated with the given user identifier with the second service provider IT system. If responsive messaging from the second service provider IT system indicates that qualification of the user associated with the given user identifier was successful, the service provider identifier 220 determines that the second service provider IT system is associated with the user associated with the given user identifier. However, if qualification of the user was unsuccessful, the service provider identifier 220 may continue to invoke other QUALIFY_USER APIs 405 corresponding to other service provider IT systems until a successful qualification result is received, or all service provider IT systems have been queried.

In some examples, the service provider identifier 220 stores associations of device/user identifiers with corresponding service providers so that appropriate service-specific southbound APIs can be invoked when performing operations associated with a given device/user identifier. In some examples, the service provider identifier 220 permits service provider IT systems to register with the service provider identifier 220. In some such examples, the service provider identifier 220 will restrict attempts to associate devices/users with service providers to only those service providers that have registered with the service provider identifier 220.

The example integrator system 115 of FIG. 2 also includes example API transformer and business logic 225 to transform messaging conforming to the northbound APIs (e.g., the example northbound APIs 300 of FIG. 3) implemented by the example northbound API logic 210 to corresponding messaging conforming to the southbound APIs (e.g., the example southbound APIs 400 of FIG. 4) implemented by the example southbound API logic 215, and vice versa. In some examples, the example API transformer and business logic 225 performs such northbound-to-southbound transformations by invoking a given northbound API implemented by the example northbound API logic 210 to receive and extract data from a message received from an enterprise service provider and conforming to the given northbound API. The example API transformer and business logic 225 in such examples then reformats the extracted data, if appropriate, and invokes a corresponding southbound API implemented by the example southbound API logic 215 to prepare and transmit a corresponding message conforming to the given southbound API to the appropriate service provider IT system.

For example, the API transformer and business logic 225 may invoke a GET_SERVICE_CATALOG API 315 implemented by the northbound API logic 210 to receive messaging from an enterprise service provider requesting a catalog of available services for a device identified in the message, reformat the device identifier, if appropriate, and then invoke an appropriate, service provider specific ACCESS_SERVICE_OFFERINGS API 415 implemented by the southbound API logic 215 to prepare and send messaging to the particular service provider IT system associated with the identified device to request a list of available services for the device. As another example, the API transformer and business logic 225 may invoke an ORDER_DATA_SERVICE API 330 implemented by the northbound API logic 210 to receive messaging from an enterprise service specifying a data service to be ordered for a device identified in the message, reformat the device identifier and/or service identification information, if appropriate, and then invoke an appropriate, service provider specific PROVISION_DATA_SERVICE API 430 implemented by the southbound API logic 215 to prepare and send messaging to the particular service provider IT system associated with the identified device to provision the selected data service for the device. As yet another example, the API transformer and business logic 225 may invoke an ORDER_VOICE_SERVICE API 335 implemented by the northbound API logic 210 to receive messaging from an enterprise service specifying a voice service to be ordered for a device identified in the message, reformat the device identifier and/or service identification information, if appropriate, and then invoke an appropriate, service provider specific PROVISION_VOICE_SERVICE API 445 implemented by the southbound API logic 215 to prepare and send messaging to the particular service provider IT system associated with the identified device to provision the selected voice service for the device. As still another example, the API transformer and business logic 225 may invoke a GET_STATUS API 340 implemented by the northbound API logic 210 to receive messaging from an enterprise service requesting status for a device identified in the message, reformat the device identifier, if appropriate, and then invoke an appropriate, service provider specific ACCESS_STATUS API 460 implemented by the southbound API logic 215 to prepare and send messaging to the particular service provider IT system associated with the identified device to request status for the device.

In some examples, the example API transformer and business logic 225 performs southbound-to-northbound transformations by invoking a given southbound API implemented by the example southbound API logic 215 to receive and extract data from a message received from a particular service provider IT system and conforming to the given southbound API. The example API transformer and business logic 225 in such examples then reformats the extracted data, if appropriate, and invokes a corresponding northbound API implemented by the example northbound API logic 210 to prepare and transmit a corresponding message conforming to the given northbound API to the appropriate enterprise mobility service.

For example, the API transformer and business logic 225 may invoke an appropriate, service provider specific ACCESS_SERVICE_OFFERINGS API 415 implemented by the southbound API logic 215 to receive messaging from a particular service provider IT system returning a list of available services for a device identified in the message, reformat the device identifier and available service information, if appropriate, and then invoke a GET_SERVICE_CATALOG API 315 implemented by the northbound API logic 210 to prepare and send messaging to a requesting enterprise mobility service to return a catalog of available services for the device. As another example, the API transformer and business logic 225 may invoke an appropriate, service provider specific ACCESS_STATUS API 460 implemented by the southbound API logic 215 to receive messaging from a particular service provider IT system reporting status for a device identified in the message, reformat the device identifier and status information, if appropriate, and then invoke a GET_STATUS API 340 implemented by the northbound API logic 210 to prepare and send messaging to a requesting enterprise mobility service to report the status for the device.

In some examples, the API transformer and business logic 225 includes logic to invoke combinations of APIs to simplify operation of the enterprise mobility services in communication with the integrator system 115, and/or to simplify interaction between the enterprise mobility services and integrator system 115, etc. For example, in response to the northbound API logic 210 receiving a message conforming to the ADD_DEVICES API 310, the API transformer and business logic 225 may invoke the service provider identifier 220 to identify the service provider(s) associated with the respective device(s) whose device identifier(s) is(are) listed in the received message. Then, for each device for which an associated service provider is identified, the API transformer and business logic 225 may automatically invoke the appropriate service provider specific ACCESS_SERVICE_OFFERINGS API 415 implemented by the southbound API logic 215 to obtain a list of services available for the given device. The API transformer and business logic 225 may then further automatically invoke the GET_SERVICE_CATALOG API 315 implemented by the northbound API logic 210 to report this list of services as a catalog of service available for the given device.

In some examples, the integrator system 115 of FIG. 2 includes an example service offering aggregator 230 to aggregate or otherwise modify the set of services available from a given service provider for a given device into a modified set of services offered by the integrator. For example, the service offering aggregator 230 may combine available data services and voice services identified for a given device via the southbound ACCESS_SERVICE_OFFERINGS API 415, ACCESS_DATA_SERVICES API 420 and/or ACCESS_VOICE_SERVICES API 425 into particular service combinations to be offered by the integrator system 115 for the given device. The integrator system may then provide these particular service combinations in messaging sent to a requesting enterprise mobility service via the GET_SERVICE_CATALOG API 315. As another example, the service offering aggregator 230 may filter available data services and voice services identified for a given device via the southbound ACCESS_SERVICE_OFFERINGS API 415, ACCESS_DATA_SERVICES API 420 and/or ACCESS_VOICE_SERVICES API 425 into a reduced listing of service offerings to be offered by the integrator system 115 for the given device. The integrator system may then provide this reduced listing of service offerings in messaging sent to a requesting enterprise mobility service via the GET_SERVICE_CATALOG API 315.

Figure 5:
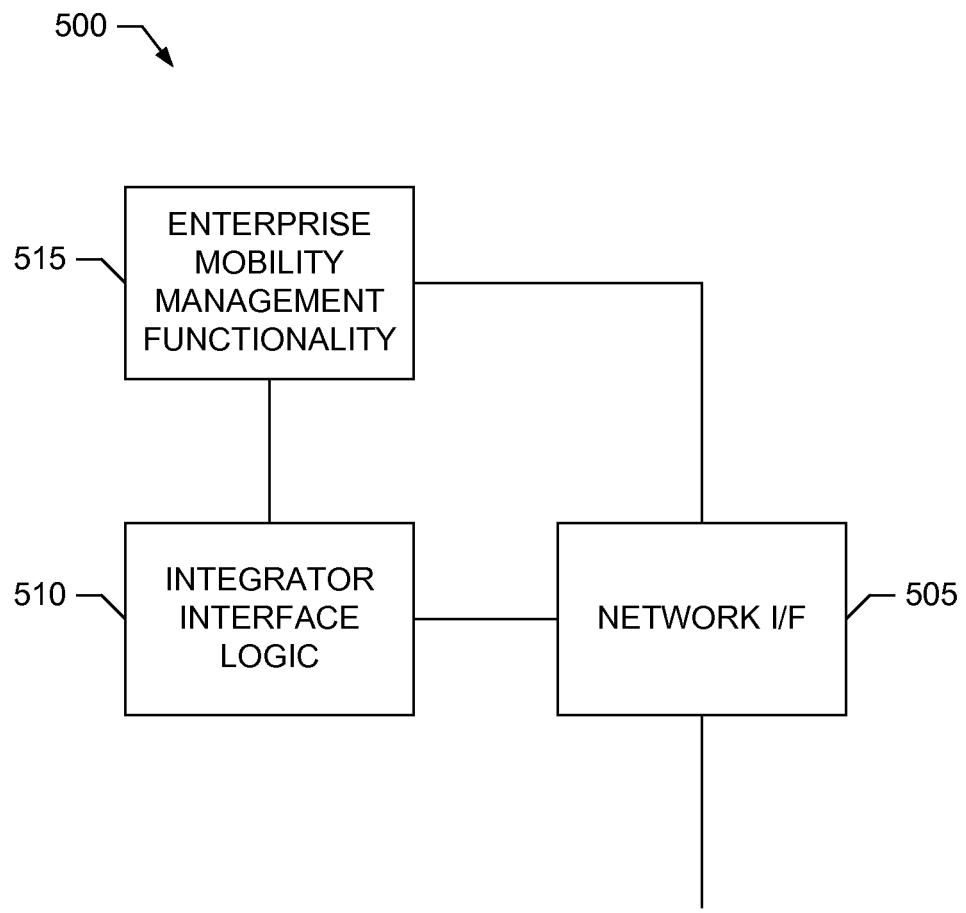
FIG. 5 is a block diagram of an example implementation of an example enterprise mobility service included in the example system of FIG. 1.

A block diagram of an example EMM system 500 that may be used to implement one or more of the example enterprise mobility services 105A-D of FIG. 1 is illustrated in FIG. 5. The example EMM system 500 of FIG. 5 includes an example network interface 505 to connect to one or more communication networks, links, etc., such as the example networks 120 and/or 125 of FIG. 1. The example network interface 505 can be implemented by any type(s), number(s) and/or combination(s) of interfaces, such as the example interface circuit 1420 of FIG. 14, which is described in further detail below.

The example EMM system 500 of FIG. 5 also includes example integrator interface logic 510 to implement a set of northbound APIs to format and exchange messaging for interfacing with integrator systems, such as the example integrator systems 115, 115A and/or 115B of FIGS. 1-2. As noted above, the set of northbound APIs implemented by the integrator interface logic 510 is service provider agnostic. For example, the integrator interface logic 510 may implement the enterprise-side components of the example set of northbound APIs 300 of FIG. 3, as disclosed in further detail above.

In the illustrated example of FIG. 5, the integrator interface logic 510 permits integration of the set of northbound APIs with any other example enterprise mobility management functionality 515 included in the example EMM system 500. For example, the northbound APIs provided by the integrator interface logic 510 may be implemented by one or more SDKs that can be integrated with one or more applications (e.g., such as interface applications, management applications, etc.) implementing the enterprise mobility management functionality 515. In this way, the EMM system 500 can be adapted to implement service ordering functionality in accordance with the teachings of this disclosure, while still supporting the existing enterprise mobility management functionality 515 used by enterprise administrators.

While example manners of implementing the system 100 are illustrated in FIGS. 1-5, one or more of the elements, processes and/or devices illustrated in FIGS. 1-5 may be combined, divided, re-arranged, omitted, eliminated and/or implemented in any other way. Further, the example enterprise mobility services 105A-D, the example service provider IT systems 110A-C, the example integrator systems 115 and/or 115A-B, the example network 120, the example network 125, the example network interface 205, the example northbound API logic 210, the example southbound API logic 215, the example service provider identifier 220, the example API transformer and business logic 225, the example service offering aggregator 230, the example network interface 505, the example integrator interface logic 510, the example enterprise mobility management functionality 515 and/or, more generally, the example system 100 of FIGS. 1-5 may be implemented by hardware, software, firmware and/or any combination of hardware, software and/or firmware. Thus, for example, any of the example enterprise mobility services 105A-D, the example service provider IT systems 110A-C, the example integrator systems 115 and/or 115A-B, the example network 120, the example network 125, the example network interface 205, the example northbound API logic 210, the example southbound API logic 215, the example service provider identifier 220, the example API transformer and business logic 225, the example service offering aggregator 230, the example network interface 505, the example integrator interface logic 510, the example enterprise mobility management functionality 515 and/or, more generally, the example system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example system 100, the example enterprise mobility services 105A-D, the example service provider IT systems 110A-C, the example integrator systems 115 and/or 115A-B, the example network 120, the example network 125, the example network interface 205, the example northbound API logic 210, the example southbound API logic 215, the example service provider identifier 220, the example API transformer and business logic 225, the example service offering aggregator 230, the example network interface 505, the example integrator interface logic 510 and/or the example enterprise mobility management functionality 515 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 may include one or more elements, processes and/or devices in addition to, or instead of, those illustrated in FIGS. 1-5, and/or may include more than one of any or all of the illustrated elements, processes and devices.

Flowcharts representative of example machine readable instructions for implementing the example system 100, the example enterprise mobility services 105A-D, the example service provider IT systems 110A-C, the example integrator systems 115 and/or 115A-B, the example network 120, the example network 125, the example network interface 205, the example northbound API logic 210, the example southbound API logic 215, the example service provider identifier 220, the example API transformer and business logic 225, the example service offering aggregator 230, the example network interface 505, the example integrator interface logic 510 and/or the example enterprise mobility management functionality 515 are shown in FIGS. 6-12. In these examples, the machine readable instructions comprise one or more programs for execution by a processor, such as the processor 1312 and/or 1412 shown in the example processor platforms 1300 and/or 1400 discussed below in connection with FIGS. 13 and 14. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processors 1312 and/or 1412, but the entire program or programs and/or portions thereof could alternatively be executed by a device other than the processors 1312 and/or 1412, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 6-12, many other methods of implementing the example system 100, the example enterprise mobility services 105A-D, the example service provider IT systems 110A-C, the example integrator systems 115 and/or 115A-B, the example network 120, the example network 125, the example network interface 205, the example northbound API logic 210, the example southbound API logic 215, the example service provider identifier 220, the example API transformer and business logic 225, the example service offering aggregator 230, the example network interface 505, the example integrator interface logic 510 and/or the example enterprise mobility management functionality 515 may alternatively be used. For example, with reference to the flowcharts illustrated in FIGS. 6-12, the order of execution of the blocks may be changed, and/or some of the blocks described may be changed, eliminated, combined and/or subdivided into multiple blocks.

As mentioned above, the example processes of FIGS. 6-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-12 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

Figure 6:
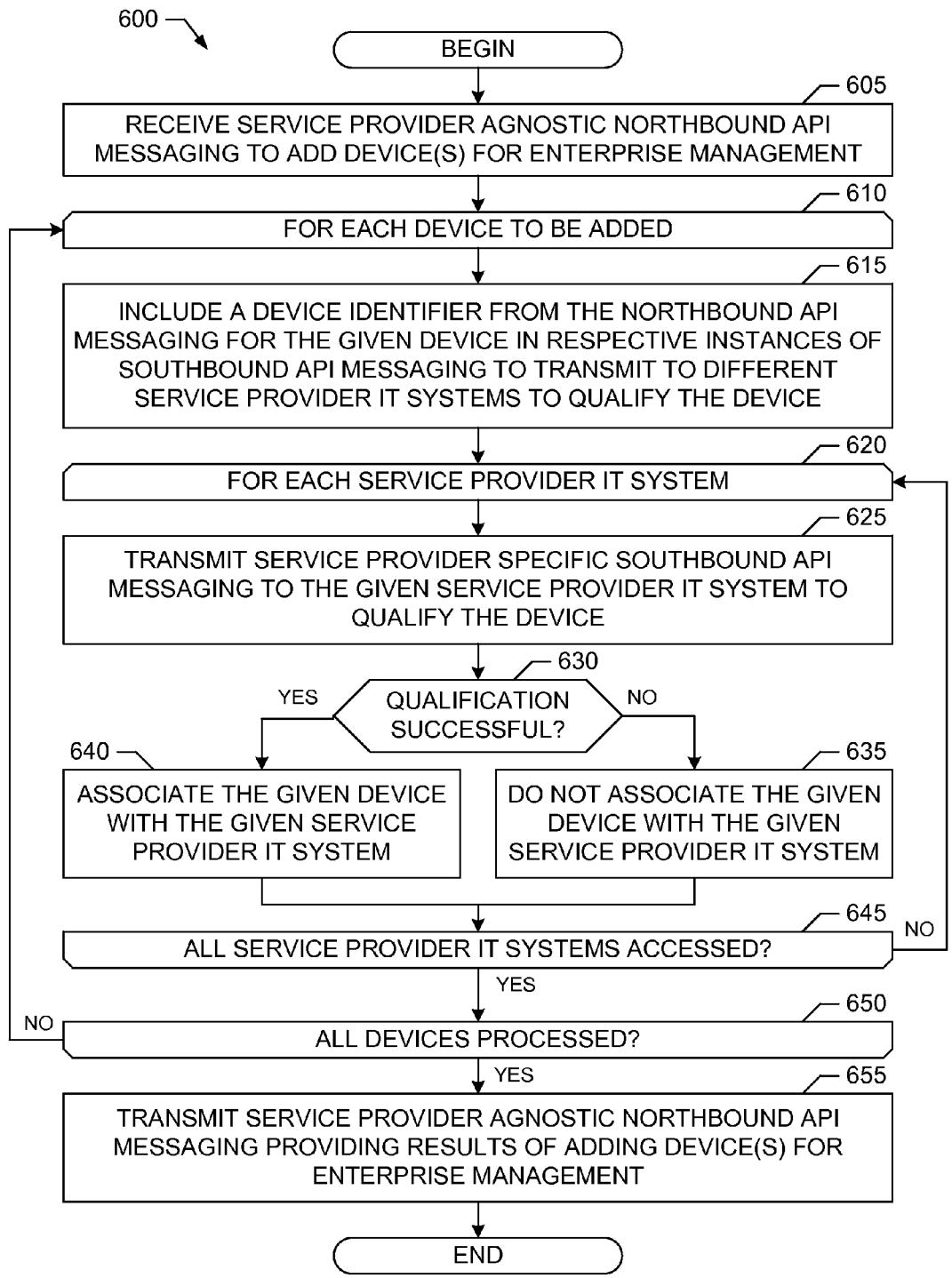
FIG. 6 is a flowchart representative of example machine readable instructions that may be executed to implement processing in the example integrator system(s) of FIGS. 1 and/or 2 to perform device qualification for device(s) to be managed by an enterprise.

An example program 600 that may be executed to implement the integrator systems 115 and/or 115A-B of FIGS. 1-2 is represented by the flowchart shown in FIG. 6. The example program 600 performs device qualification for device(s) to be managed by an enterprise. For convenience and without loss of generality, execution of the example program 600 is described from the perspective of the example integrator system 115 of FIG. 2 implementing the example integrator system 115A of FIG. 1 and interacting with the example enterprise mobility service 105A. With reference to the preceding figures and associated written descriptions, the example program 600 of FIG. 6 begins execution at block 605 at which the example northbound API logic 210 of the integrator system 115 receives, from the enterprise mobility service 105A, service provider agnostic northbound API messaging conforming to the ADD_DEVICES API 310, which specifies device identifier(s) for device(s) to be managed by the enterprise mobility service 105A.

At block 610, the example service provider identifier 220 of the integrator system 115 is invoked to begin processing each device identifier included in the messaging received at block 605. For example, at block 615, the service provider identifier 220 invokes the example southbound API logic 215 of the integrator system 115 to include a given device identifier for a given device in respective instances of service provider specific southbound API messaging conforming to the different QUALIFY_USERS APIs 405 corresponding to the different service provider IT systems 110A-C in which the integrator system 115 is in communication. At block 620, the service provider identifier 220 iterates through attempting to qualify the given device associated with the given device identifier to identify the particular service provider associated with (e.g., providing services for) the given device.

For example, at block 625, the service provider identifier 220 invokes the southbound API logic 215 of the integrator system 115 to transmit messaging conforming to a first one of the different QUALIFY_USERS APIs 405 corresponding to a first one of the different service provider IT systems 110A-C to attempt to qualify the given device with that particular service provider IT system. If the particular service provider IT system returns responsive messaging, which conforms to the QUALIFY_USERS API 405, indicating qualification was not successful (block 630), the service provider identifier 220 determines that the given device being processed is not associated with that particular service provider IT system (block 635). However, if the particular service provider IT system returns a response indicating qualification was successful (block 640), the service provider identifier 220 determines that the given device being processed is associated with that particular service provider IT system.

At block 645, the service provider identifier 220 continues invoking the southbound API logic 215 of the integrator system 115 to transmit messaging conforming to the different QUALIFY_USERS APIs 405 corresponding to the different service provider IT systems 110A-C until all service provider IT systems 110A-C have been queried, or a successful qualification result has been received. At block 650, the service provider identifier 220 continues identifying the particular service provider(s) associated with the different devices whose device identifiers were included in the messaging received at block 605 until all devices have been processed. At block 655, the service provider identifier 220 invokes the northbound API logic 210 of the integrator system 115 to send responsive messaging to the enterprise mobility service 105A conforming to the ADD_DEVICES API 310 to report the results of qualifying the devices whose device identifiers were listed in the messaging received at block 605. For example, the responsive messaging may indicate, for each device identifier listed in the messaging received at block 605, whether qualification was successful and, if so, the particular service provider associated with the given device.

Figure 7:
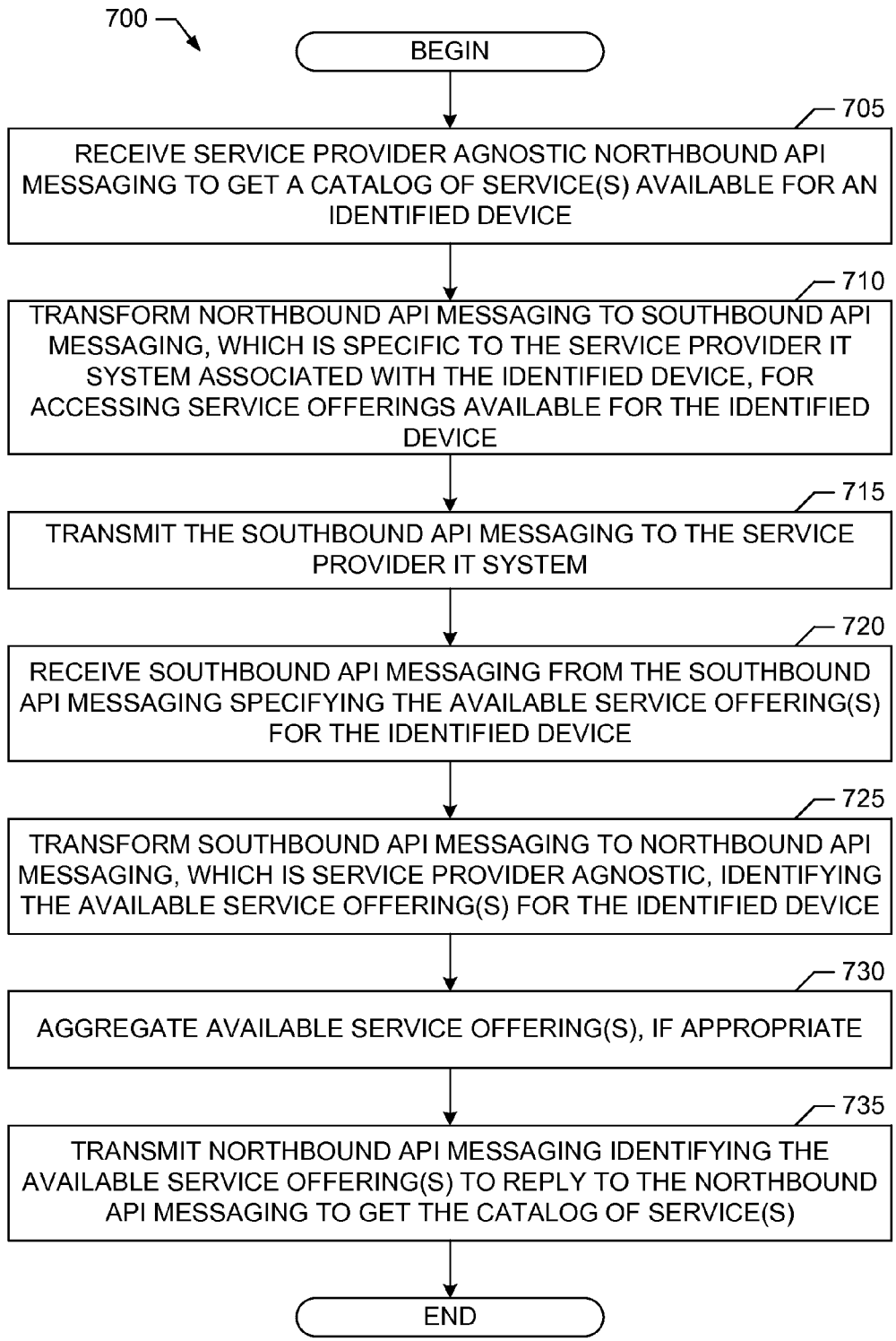
FIG. 7 is a flowchart representative of example machine readable instructions that may be executed to implement processing in the example integrator system(s) of FIGS. 1 and/or 2 to access a catalog of available service offerings for an identified device.

An example program 700 that may be executed to implement the integrator systems 115 and/or 115A-B of FIGS. 1-2 is represented by the flowchart shown in FIG. 7. The example program 600 accesses a catalog of available service offerings for an identified device. For convenience and without loss of generality, execution of the example program 700 is described from the perspective of the example integrator system 115 of FIG. 2 implementing the example integrator system 115A of FIG. 1 and interacting with the example enterprise mobility service 105A. With reference to the preceding figures and associated written descriptions, the example program 700 of FIG. 7 begins execution at block 705 at which the example northbound API logic 210 of the integrator system 115 receives, from the enterprise mobility service 105A, service provider agnostic northbound API messaging conforming to the GET_SERVICE_CATALOG API 315, which specifies a device identifier of a given device for which the enterprise mobility service 105A is requesting a catalog of available services.

At block 710, the example API transformer and business logic 225 of the integrator system 115 transforms data, such as the device identifier, included in the service provider agnostic northbound API messaging received at block 705 into a format compatible with service provider specific southbound API messaging conforming to the particular ACCESS_SERVICE_OFFERINGS API 415 for the particular service provider associated with the device identified by that device identifier. At block 715, the API transformer and business logic 225 invokes the example southbound API logic 215 of the integrator system 115 to transmit the southbound API messaging conforming to the particular ACCESS_SERVICE_OFFERINGS API 415 to the particular service provider IT system 110A-C associated with the given device identified by the device identifier included in the messaging received at block 705. In some examples, at blocks 710 and/or 715, the API transformer and business logic 225 identifies the particular service provider IT system 110A-C associated with the given device based on information provided in the messaging received at block 705, based on information maintained by the example service provider identifier 220 of the integrator system 115 to cross-reference device identifiers with associated service providers, etc.

At block 720, the southbound API logic 215 of the integrator system 115 receives responsive messaging conforming to the service provider specific ACCESS_SERVICE_OFFERINGS API 415, which includes a list of available services capable of being provided by the particular service provider IT system 110A-C for the given device. At block 725, the API transformer and business logic 225 transforms data, such as the list of available services, included in the service provider specific southbound API messaging received at block 720 into a format compatible with service provider agnostic northbound API messaging conforming to the GET_SERVICE_CATALOG API 315. At block 730, the example service offering aggregator 230 performs service aggregation, if appropriate, as described above. At block 735, the API transformer and business logic 225 invokes the northbound API logic 210 of the integrator system 115 to transmit responsive northbound API messaging conforming to the GET_SERVICE_CATALOG API 315 to the enterprise mobility service 105A to return the catalog of available services for the device identified in the messaging received at block 705.

Figure 8:
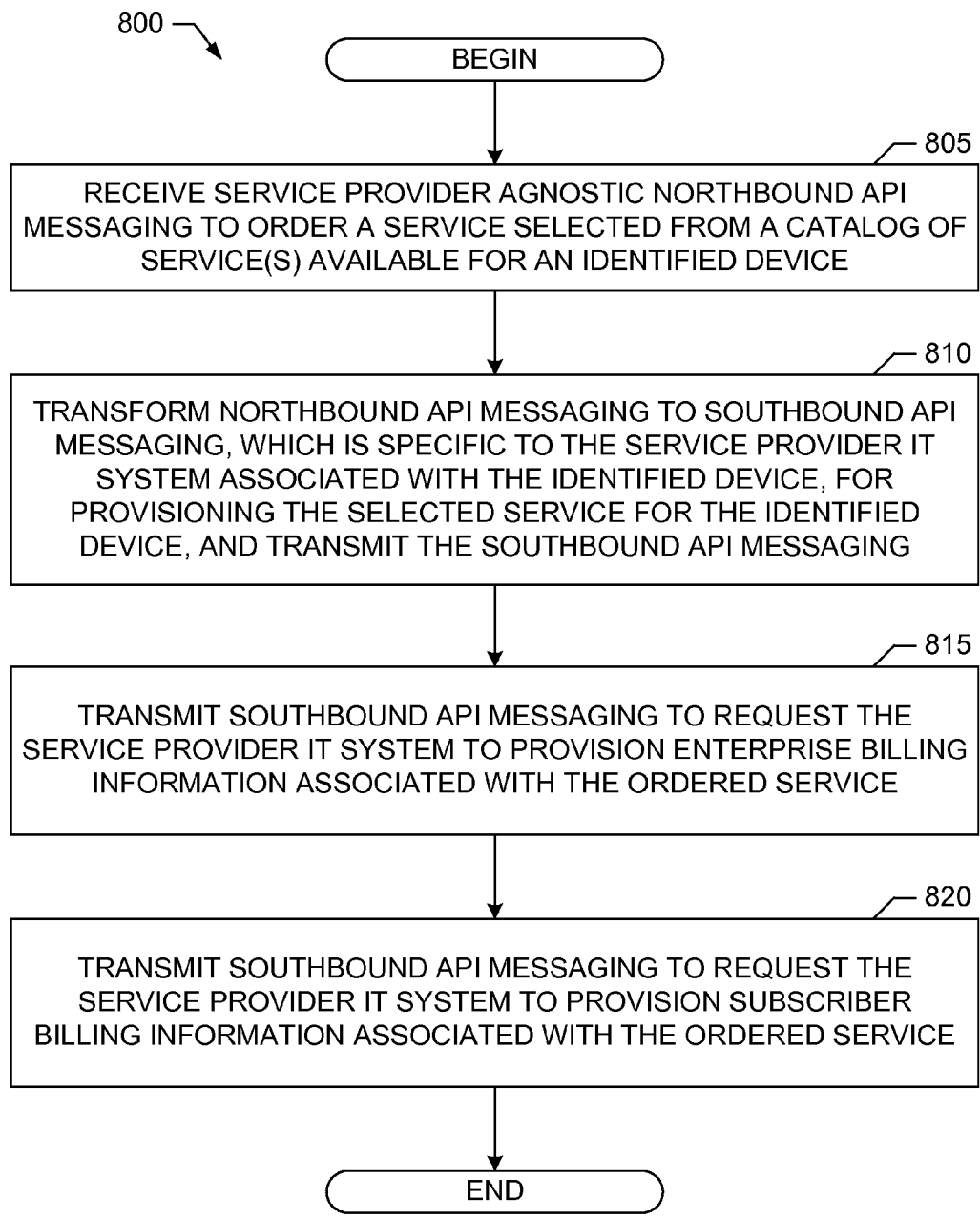
FIG. 8 is a flowchart representative of example machine readable instructions that may be executed to implement processing in the example integrator system(s) of FIGS. 1 and/or 2 to order a selected service for an identified device.

An example program 800 that may be executed to implement the integrator systems 115 and/or 115A-B of FIGS. 1-2 is represented by the flowchart shown in FIG. 8. The example program 800 orders a selected service for an identified device. For convenience and without loss of generality, execution of the example program 800 is described from the perspective of the example integrator system 115 of FIG. 2 implementing the example integrator system 115A of FIG. 1 and interacting with the example enterprise mobility service 105A. With reference to the preceding figures and associated written descriptions, the example program 800 of FIG. 8 begins execution at block 805 at which the example northbound API logic 210 of the integrator system 115 receives, from the enterprise mobility service 105A, service provider agnostic northbound API messaging conforming to the ORDER_DATA_SERVICE API 330 or the ORDER_VOICE_SERVICE API 335, which specifies a selected data or voice service, respectively, to be ordered for a given device for identified by a device identifier included in the received messaging.

At block 810, the example API transformer and business logic 225 of the integrator system 115 transforms data, such as the device identifier and service selection information, included in the service provider agnostic northbound API messaging received at block 705 into a format compatible with service provider specific southbound API messaging conforming to the appropriate PROVISION_DATA_SERVICE API 430 or PROVISION_VOICE_SERVICE API 445 for provisioning services with the particular service provider associated with the device identified by that device identifier. At block 810, the API transformer and business logic 225 also invokes the example southbound API logic 215 of the integrator system 115 to transmit the southbound API messaging conforming to the appropriate PROVISION_DATA_SERVICE API 430 or PROVISION_VOICE_SERVICE API 445 to the particular service provider IT system 110A-C associated with the given device identified by the device identifier included in the messaging received at block 805 to provision the selected service for that device. In some examples, at block 810 the API transformer and business logic 225 identifies the particular service provider IT system 110A-C associated with the given device based on information provided in the messaging received at block 805, based on information maintained by the example service provider identifier 220 of the integrator system 115 to cross-reference device identifiers with associated service providers, etc.

At block 815, the API transformer and business logic 225 invokes the example southbound API logic 215 of the integrator system 115 to transmit southbound API messaging conforming to the appropriate, service provider specific PROVISION_ENTERPRISE_BILL API 435 or 450 to request the particular service provider IT system 110A-C to provision enterprise billing information associated with the ordered service for the device identified in the messaging received at block 805. At block 820, the API transformer and business logic 225 invokes the example southbound API logic 215 of the integrator system 115 to transmit southbound API messaging conforming to the appropriate, service provider specific PROVISION_SUBSCRIBER_BILL API 440 or 455 to request the particular service provider IT system 110A-C to provision subscriber billing information associated with the ordered service for the device identified in the messaging received at block 805.

Figure 9:
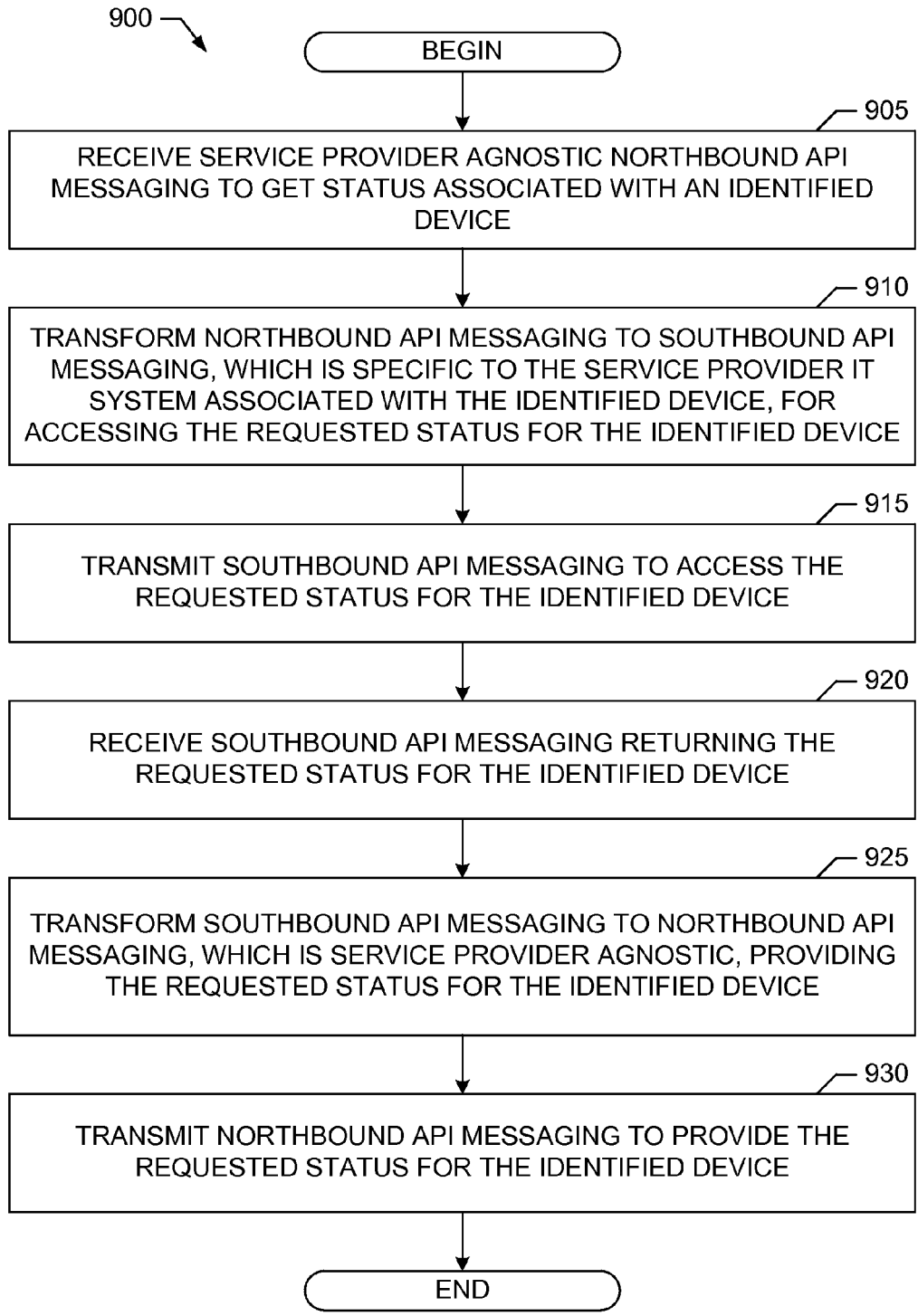
FIG. 9 is a flowchart representative of example machine readable instructions that may be executed to implement processing in the example integrator system(s) of FIGS. 1 and/or 2 to obtain status for an identified device.

An example program 900 that may be executed to implement the integrator systems 115 and/or 115A-B of FIGS. 1-2 is represented by the flowchart shown in FIG. 9. The example program 900 obtains status for an identified device. For convenience and without loss of generality, execution of the example program 900 is described from the perspective of the example integrator system 115 of FIG. 2 implementing the example integrator system 115A of FIG. 1 and interacting with the example enterprise mobility service 105A. With reference to the preceding figures and associated written descriptions, the example program 900 of FIG. 9 begins execution at block 905 at which the example northbound API logic 210 of the integrator system 115 receives, from the enterprise mobility service 105A, service provider agnostic northbound API messaging conforming to the GET_STATUS API 340, which specifies a device identifier for a given device for which the enterprise mobility service 105A is requesting status.

At block 910, the example API transformer and business logic 225 of the integrator system 115 transforms data, such as the device identifier, included in the service provider agnostic northbound API messaging received at block 905 into a format compatible with service provider specific southbound API messaging conforming to the particular ACCESS_STATUS API 460 for the particular service provider associated with the device identified by that device identifier. At block 915, the API transformer and business logic 225 invokes the example southbound API logic 215 of the integrator system 115 to transmit the southbound API messaging conforming to the particular ACCESS_STATUS API 460 to the particular service provider IT system 110A-C associated with the given device identified by the device identifier included in the messaging received at block 905. In some examples, at blocks 910 and/or 915, the API transformer and business logic 225 identifies the particular service provider IT system 110A-C associated with the given device based on information provided in the messaging received at block 905, based on information maintained by the example service provider identifier 220 of the integrator system 115 to cross-reference device identifiers with associated service providers, etc.

At block 920, the southbound API logic 215 of the integrator system 115 receives responsive messaging conforming to the service provider specific ACCESS_STATUS API 460, which includes the requested status provided by the particular service provider IT system 110A-C for the given device. At block 925, the API transformer and business logic 225 transforms data, such as subscription status information, usage metrics, etc., included in the service provider specific southbound API messaging received at block 920 into a format compatible with service provider agnostic northbound API messaging conforming to the GET_STATUS API 340. At block 930, the API transformer and business logic 225 invokes the northbound API logic 210 of the integrator system 115 to transmit responsive northbound API messaging conforming to the GET_STATUS API 340 to the enterprise mobility service 105A to return the requested status for the device identified in the messaging received at block 905.

Figure 10:
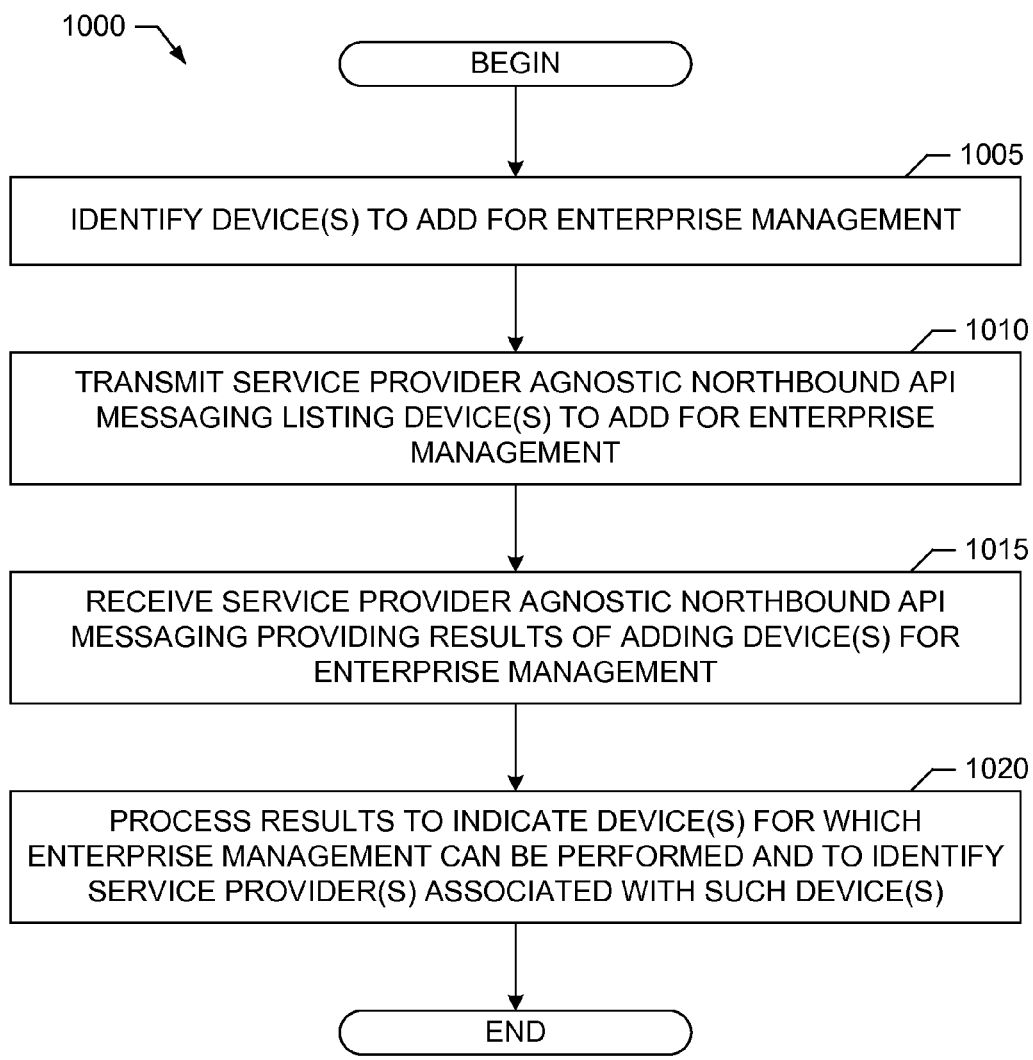
FIG. 10 is a flowchart representative of example machine readable instructions that may be executed to implement processing in the example enterprise mobility service(s) of FIGS. 1 and/or 5 to add device(s) to be managed by an enterprise.

An example program 1000 that may be executed to implement the example EMM system 500 of FIG. 5 is represented by the flowchart shown in FIG. 10. The example program 1000 adds device(s) to be managed by an enterprise. For convenience and without loss of generality, execution of the example program 1000 is described from the perspective of the example EMM system 500 of FIG. 5 implementing the example enterprise mobility service 105A of FIG. 1, which is in communication with the example integrator system 115A. With reference to the preceding figures and associated written descriptions, the example program 1000 of FIG. 10 begins execution at block 1005 at which example enterprise mobility management functionality 515 (e.g., such as a user interface) of the example EMM system 500 is invoked to identify one or more devices to be managed by the EMM system 500. At block 1010, the example integrator interface logic 510 of the EMM system 500 is invoked to prepare and transmit, to the integrator system 115A, service provider agnostic northbound API messaging conforming to the ADD_DEVICES API 310, which specifies the one or more device identifiers for the one or more devices identified at block 1005.

At block 1015, the integrator interface logic 510 receives, from the integrator system 115A, responsive messaging conforming to the ADD_DEVICES API 310, which provides the results of adding the identified device(s) for enterprise management. For example, the responsive messaging may indicate, for each device identifier listed in the messaging transmitted at block 1010, whether the device was added for enterprise management successfully and, if so, the particular service provider associated with the given device. At block 1020, the enterprise mobility management functionality 515 (e.g., such as a user interface) of the example EMM system 500 is invoked to process the results received at block 1015 to indicate (e.g., display to an enterprise administrator) the device(s) for which enterprise management can be performed, and to identify the particular service provider(s) associated with those device(s).

Figure 11:
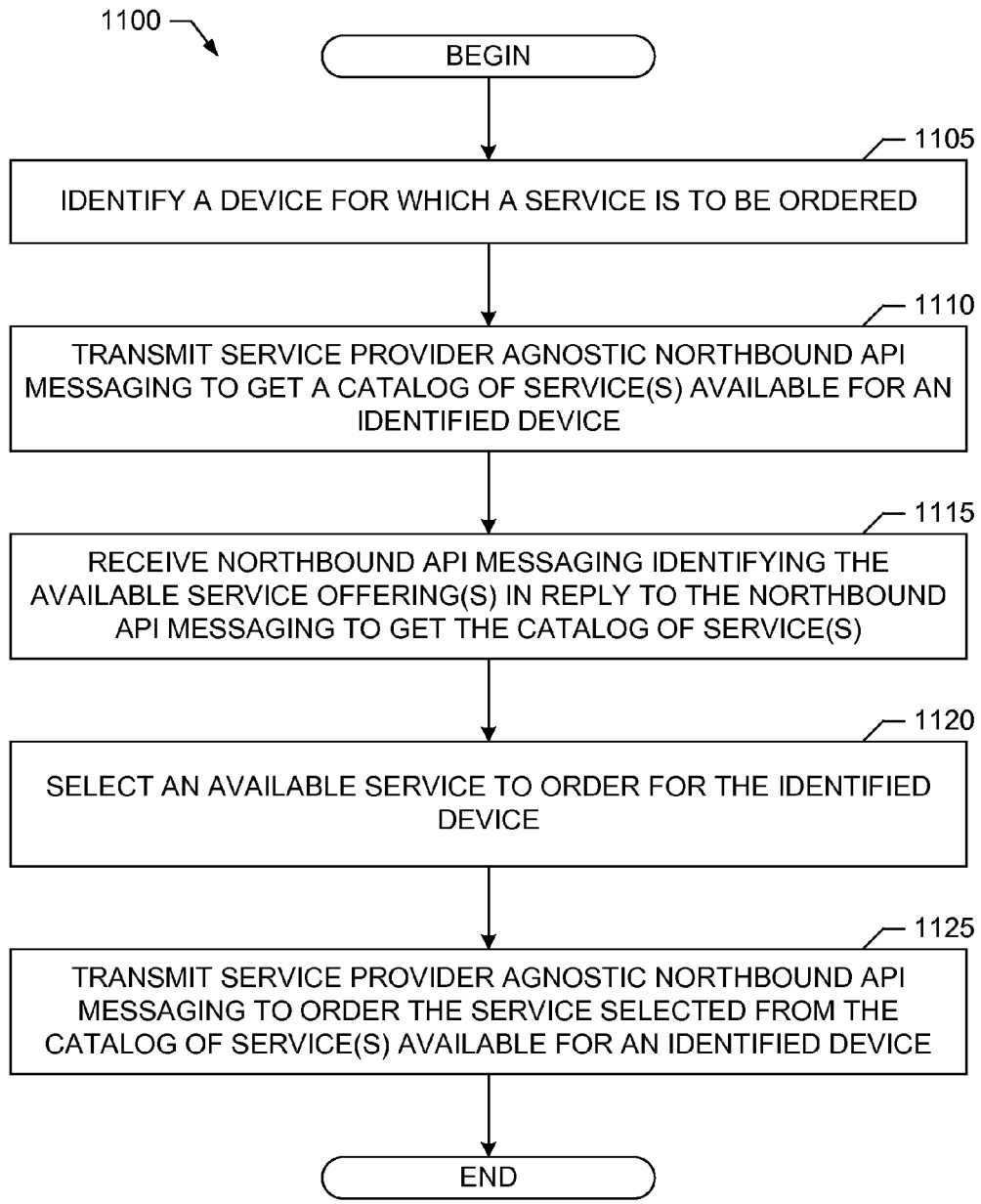
FIG. 11 is a flowchart representative of example machine readable instructions that may be executed to implement processing in the example enterprise mobility service(s) of FIGS. 1 and/or 5 to get a catalog of available service offerings and order a selected service for an identified device.

An example program 1100 that may be executed to implement the example EMM system 500 of FIG. 5 is represented by the flowchart shown in FIG. 11. The example program 1100 gets a catalog of available service offerings and orders a selected service for an identified device. For convenience and without loss of generality, execution of the example program 1100 is described from the perspective of the example EMM system 500 of FIG. 5 implementing the example enterprise mobility service 105A of FIG. 1, which is in communication with the example integrator system 115A. With reference to the preceding figures and associated written descriptions, the example program 1100 of FIG. 11 begins execution at block 1105 at which example enterprise mobility management functionality 515 (e.g., such as a user interface) of the example EMM system 500 is invoked to identify a device for which a service is to be ordered. At block 1110, the example integrator interface logic 510 of the EMM system 500 is invoked to prepare and transmit, to the integrator system 115A, service provider agnostic northbound API messaging conforming to the GET_SERVICE_CATALOG API 315, which includes a device identifier to request a catalog of available services for the device identified at block 1105. At block 1115, the integrator interface logic 510 of the EMM system 500 receives responsive messaging conforming to the GET_SERVICE_CATALOG API 315, which includes the catalog of available services for the identified device.

At block 1120, the enterprise mobility management functionality 515 (e.g., such as a user interface) of the example EMM system 500 is invoked to present the catalog of available services for the identified device, and receive a service selection specified a service to be ordered for the identified device. At block 1125, the integrator interface logic 510 of the EMM system 500 is invoked to prepare and transmit, to the integrator system 115A, service provider agnostic northbound API messaging conforming to the ORDER_DATA_SERVICE API 330 or the ORDER_VOICE_SERVICE API 335, which specifies a selected data or voice service to be ordered for the identified device.

Figure 12:
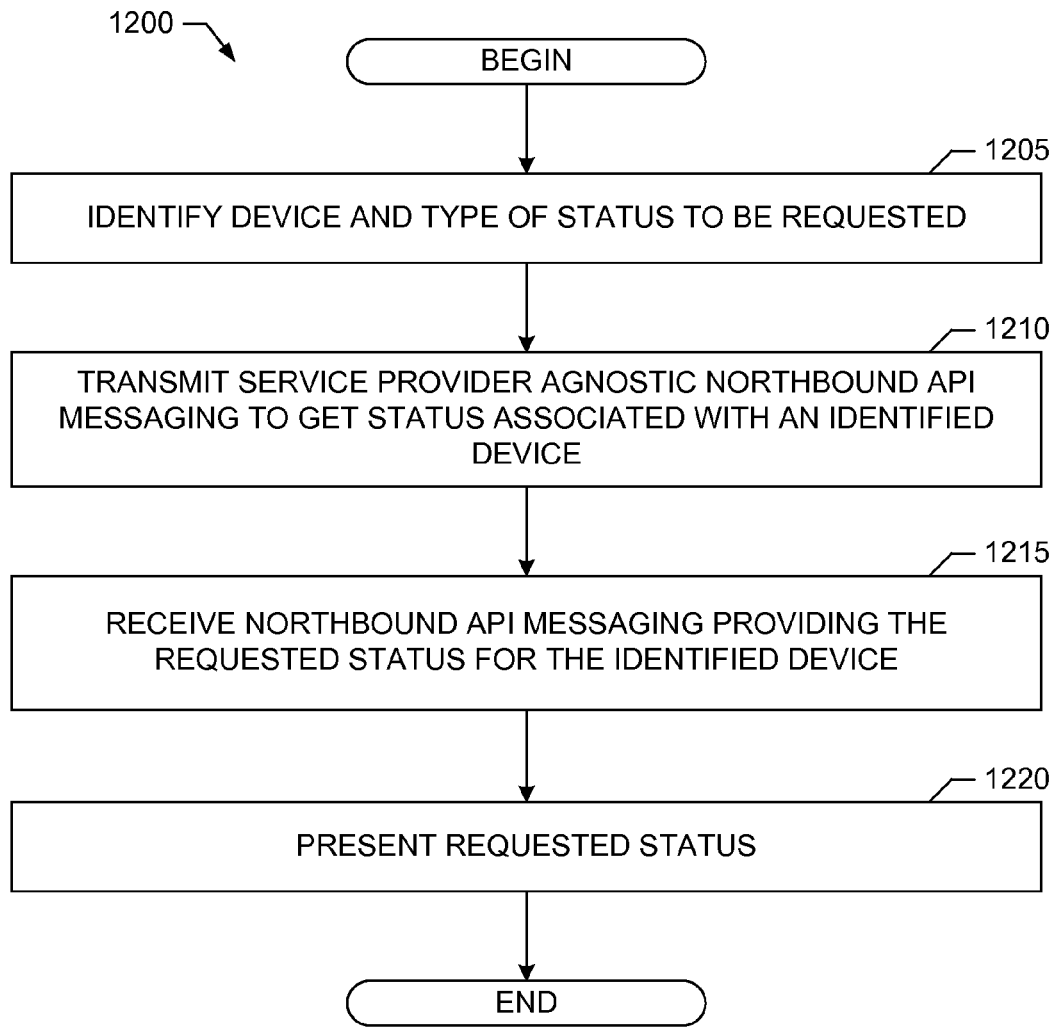
FIG. 12 is a flowchart representative of example machine readable instructions that may be executed to implement processing in the example enterprise mobility service(s) of FIGS. 1 and/or 5 to get status for an identified device.

An example program 1200 that may be executed to implement the example EMM system 500 of FIG. 5 is represented by the flowchart shown in FIG. 12. The example program 1200 gets status for an identified device. For convenience and without loss of generality, execution of the example program 1200 is described from the perspective of the example EMM system 500 of FIG. 5 implementing the example enterprise mobility service 105A of FIG. 1, which is in communication with the example integrator system 115A. With reference to the preceding figures and associated written descriptions, the example program 1200 of FIG. 12 begins execution at block 1205 at which example enterprise mobility management functionality 515 (e.g., such as a user interface) of the example EMM system 500 is invoked to identify a device for which status is to be requested, and to determine the type of status (e.g., subscription status, usage metrics, etc.) to be requested. At block 1210, the example integrator interface logic 510 of the EMM system 500 is invoked to prepare and transmit, to the integrator system 115A, service provider agnostic northbound API messaging conforming to the GET_STATUS API 340, which includes a device identifier of the device for which status is requested. At block 1215, the integrator interface logic 510 of the EMM system 500 receives responsive messaging conforming to the GET_STATUS API 340, which includes the requested status for the identified device. At block 1220, the enterprise mobility management functionality 515 (e.g., such as a user interface) of the example EMM system 500 is invoked to present (e.g., display to an enterprise administrator) the requested status.

Figure 13:
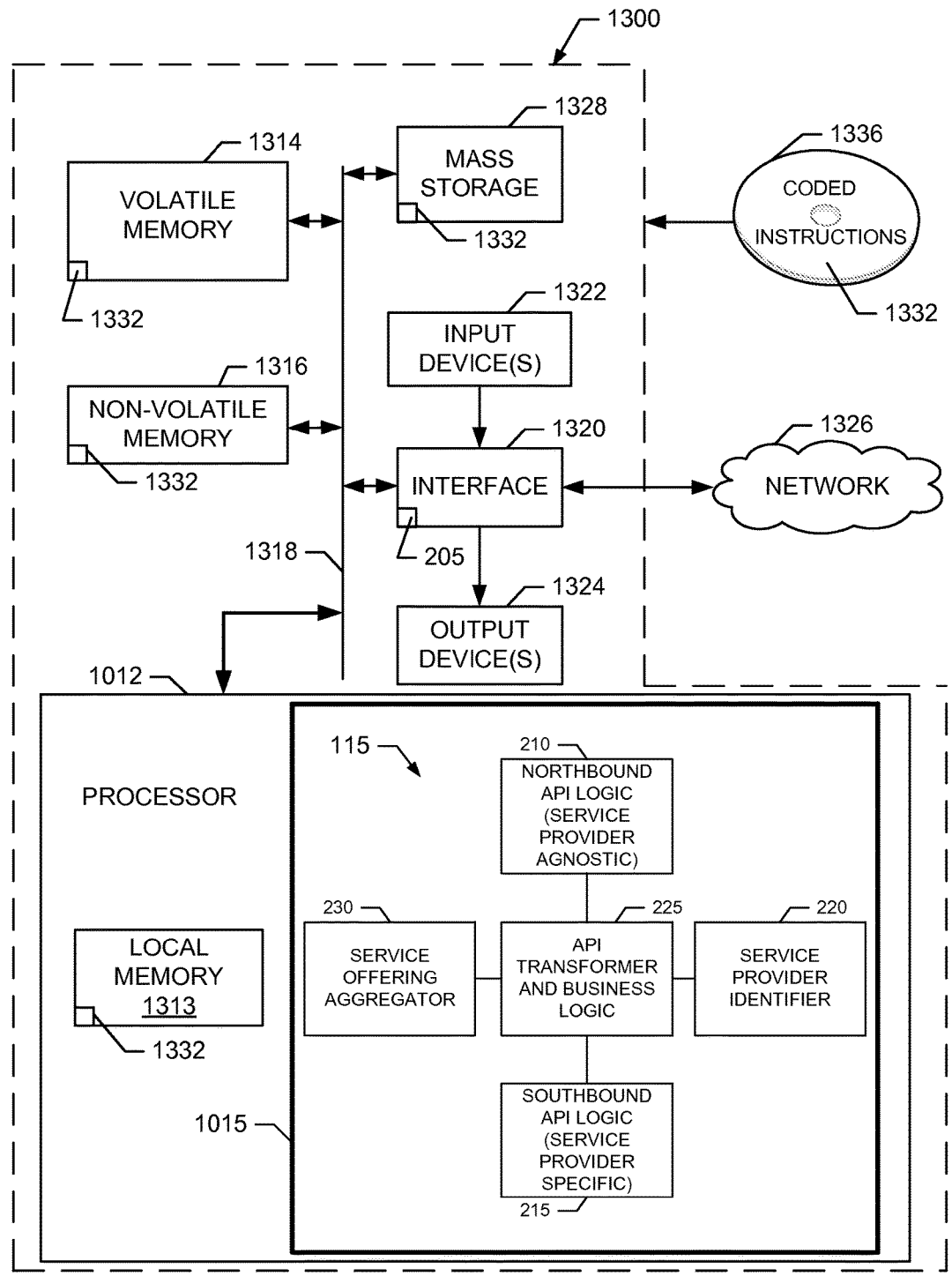
FIG. 13 is a block diagram of an example processor platform structured to execute the example machine readable instructions of FIGS. 6-8 and/or 9 to implement the example integrator system(s) of FIGS. 1 and/or 2.

FIG. 13 is a block diagram of an example processor platform 1300 capable of executing the instructions of FIGS. 6-8 and/or 9 to implement the example integrator system 115 of FIG. 2. The processor platform 1300 can be, for example, a server, a personal computer, a mobile device (e.g., a cell phone, a smart phone, a tablet such as an iPad™), a personal digital assistant (PDA), an Internet appliance, etc., or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. In the illustrated example of FIG. 13, the processor 1312 includes one or more example processing cores 1315 configured via example instructions 1332, which include the example instructions of FIGS. 6-8 and/or 9, to implement the example northbound API logic 210, the example southbound API logic 215, the example service provider identifier 220, the example API transformer and business logic 225 and/or the example service offering aggregator 230 of FIG. 2.

The processor 1312 of the illustrated example includes a local memory 1313 (e.g., a cache). The processor 1312 of the illustrated example is in communication with a main memory including a volatile memory 1314 and a non-volatile memory 1316 via a link 1318. The link 1318 may be implemented by a bus, one or more point-to-point connections, etc., or a combination thereof. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1300, can allow the user to control the computer system and provide data to the computer using physical gestures, such as, but not limited to, hand or body movements, facial expressions, and face recognition.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.). In the illustrated example of FIG. 13, the interface circuit 1320 is also structured to implement the example network interface 205 of FIG. 2.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID (redundant array of independent disks) systems, and digital versatile disk (DVD) drives.

Coded instructions 1332 corresponding to the instructions of FIGS. 6-8 and/or 9 may be stored in the mass storage device 1328, in the volatile memory 1314, in the non-volatile memory 1316, in the local memory 1313 and/or on a removable tangible computer readable storage medium, such as a CD or DVD 1336.

Figure 14:
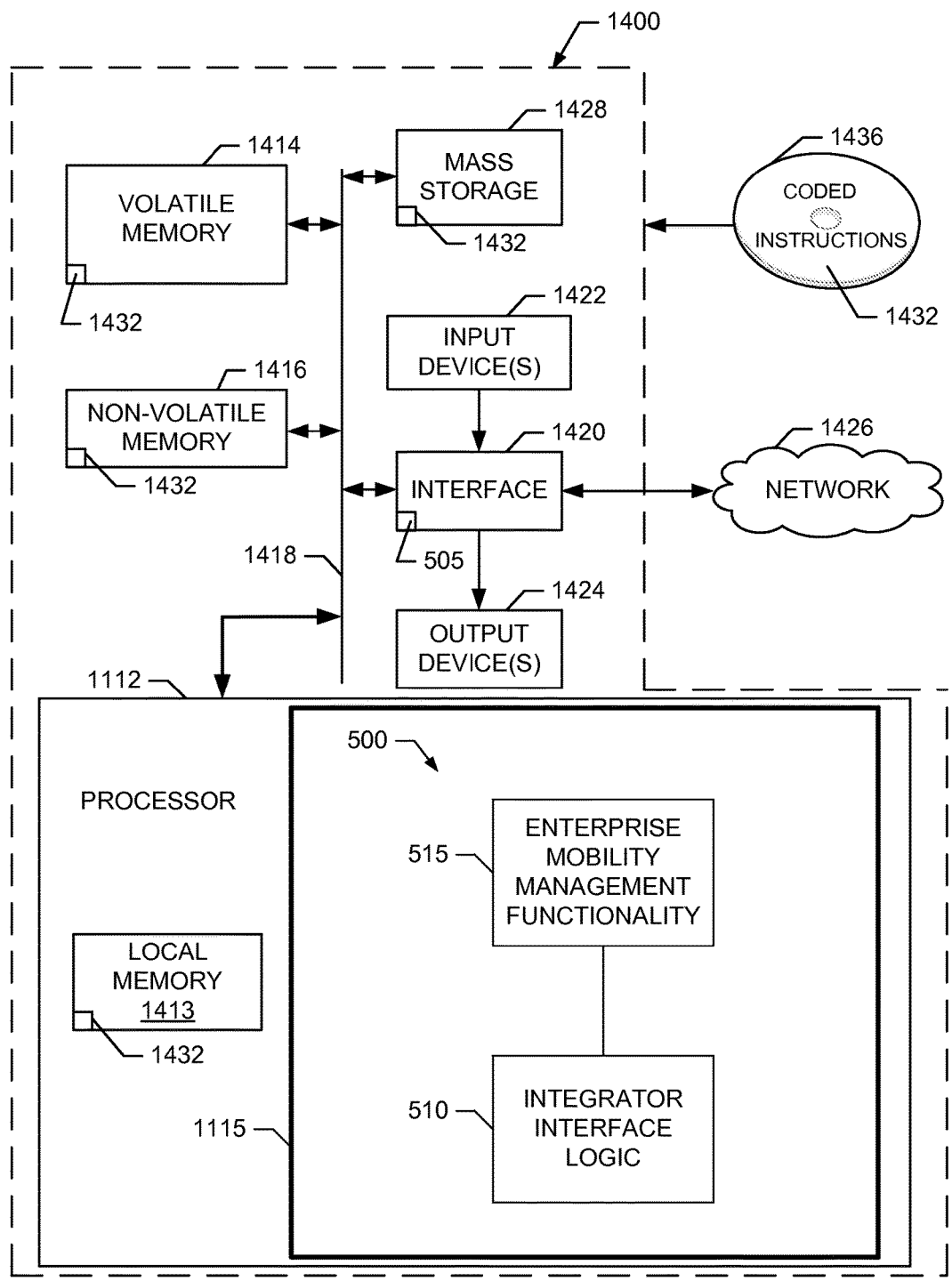
FIG. 14 is a block diagram of an example processor platform structured to execute the example machine readable instructions of FIGS. 10, 11 and/or 12 to implement the example enterprise mobility service(s) of FIGS. 1 and/or 5.

FIG. 14 is a block diagram of an example processor platform 1400 capable of executing the instructions of FIGS. 10, 11 and/or 12 to implement the example EMM system 500 of FIG. 5. The processor platform 1400 can be, for example, a server, a personal computer, a mobile device (e.g., a cell phone, a smart phone, a tablet such as an iPad™), a personal digital assistant (PDA), an Internet appliance, etc., or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer. In the illustrated example of FIG. 14, the processor 1412 includes one or more example processing cores 1415 configured via example instructions 1432, which include the example instructions of FIGS. 10, 11 and/or 12, to implement the example integrator interface logic 510 and/or the example enterprise mobility management functionality 515 of FIG. 5.

The processor 1412 of the illustrated example includes a local memory 1413 (e.g., a cache). The processor 1412 of the illustrated example is in communication with a main memory including a volatile memory 1414 and a non-volatile memory 1416 via a link 1418. The link 1418 may be implemented by a bus, one or more point-to-point connections, etc., or a combination thereof. The volatile memory 1414 may be implemented by SDRAM, DRAM, RDRAM and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a USB, and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1400, can allow the user to control the computer system and provide data to the computer using physical gestures, such as, but not limited to, hand or body movements, facial expressions, and face recognition.

One or more output devices 1424 are also connected to the interface circuit 1420 of the illustrated example. The output devices 1424 can be implemented, for example, by display devices (e.g., an LED display, an OLED display, a liquid crystal display, a CRT display, a touchscreen, a tactile output device, a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a DSL, a telephone line, coaxial cable, a cellular telephone system, etc.). In the illustrated example of FIG. 14, the interface circuit 1420 is also structured to implement the example network interface 505 of FIG. 5.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and DVDs.

Coded instructions 1432 corresponding to the instructions of FIGS. 10, 11 and/or 12 may be stored in the mass storage device 1428, in the volatile memory 1414, in the non-volatile memory 1416, in the local memory 1413 and/or on a removable tangible computer readable storage medium, such as a CD or DVD 1436.

From the foregoing, it will be appreciated that the above disclosed example methods, apparatus and articles of manufacture (e.g., physical storage media) to interface enterprise mobility services with multiple different service provider information technology systems provide a service ordering platform having a variety of potential benefits. For example, such a disclosed service ordering platform eliminates the need for service providers (e.g., mobility carriers) to enter into contractual arrangements with each enterprise. Instead, service providers (e.g., mobility carriers) can enter into one (or a few) contractual arrangements with one (or a few) integrators, and the integrators are then responsible for any contractual arrangements with the enterprises. Additionally, integrators can use the service ordering platform of the instant disclosure to aggregate service offerings into unique bundles that may provide added value to the enterprises. Furthermore, the service ordering platform of the instant disclosure allows enterprises to conveniently order/manage mobility products for their employees using third-party EMM tools with which they are familiar (such as those offered by Good Technology, MobileIron, AirWatch, Open-Peak, Soti, XenMobile, etc.) rather than having to individually access multiple, different MMPs (or, more generally, service provider IT systems) associated with the different service providers providing services for their employees' devices.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to interface with a plurality of different service provider information technology systems supporting service ordering, the method comprising:

accessing first messaging received via a network from an enterprise mobility management system to identify a first device, the first messaging conforming to a first set of application programming interfaces;

exchanging, by executing an instruction with a processor, respective instances of second messaging with respective ones of the different service provider information technology systems to identify a first one of the different service provider information technology systems associated with the first device, the instances of the second messaging including first data from the first messaging and respectively conforming to second sets of application programming interfaces that are specific to the different service provider information technology systems, the second sets of application programming interfaces different from the first set of application programming interfaces; and exchanging, by executing an instruction with the processor, third messaging with the first one of the different service provider information technology systems to determine service offerings available for the first device, the first data including a device identifier identifying the first device, and the exchanging of the respective instances of the second messaging with the respective ones of the different service provider information technology systems including:

including the device identifier in a first message conforming to a first application programming interface to query the first one of the different service provider information technology systems to qualify devices for service provisioning, the first application programming interface included in a first one of the second sets of application programming interfaces specific to the first one of the different service provider information technology systems;

transmitting the first message to the first one of the different service provider information technology systems;

accessing a second message received from the first one of the different service provider information technology systems;

transmitting a third message including the device identifier to a second one of the different service provider information technology systems, the third message conforming to a second application programming interface to query the second one of the different service provider information technology systems to qualify devices for service provisioning, the second application programming interface included in a second one of the second sets of application programming interfaces specific to the second one of the different service provider information technology systems;

determining that the second one of the different service provider information technology systems is not associated with the first device when a fourth message received from the second one of the different service provider information technology systems indicates that the first device is not qualified for service provisioning; and determining that the first one of the different service provider information technology systems is associated with the first device when the second message received from the first one of the different service provider information technology systems indicates that the first device is qualified for service provisioning.

2. The method of claim 1, wherein the first set of application programming interfaces is agnostic to the different service provider information technology systems, the third messaging conforms to the first one of the second sets of application programming interfaces specific to the first one of the different service provider information technology systems, and further including:

transforming the third messaging to fourth messaging conforming to the first set of application programming interfaces; and exchanging the fourth messaging with the enterprise mobility management system to convey the service offerings available for the first device to the enterprise mobility management system.

3. The method of claim 2, further including:

transforming fifth messaging received from the enterprise mobility management system and conforming to the first set of application programming interfaces to sixth messaging conforming to the first one of the respective second sets of application programming interfaces specific to the first one of the different service provider information technology systems; and exchanging the sixth messaging with the first one of the different service provider information technology systems to order at least one of the service offerings available for the first device.

4. The method of claim 3, wherein the fifth messaging includes a fifth message conforming to one of the first application programming interfaces to select a first service to order from a listing of available service offerings, and the sixth messaging includes (1) a sixth message conforming to a second third application programming interface to request the first one of the different service provider information technology systems to provision enterprise billing information associated with an ordered service, and (2) a seventh message conforming to a fourth application programming interface to request the first one of the different service provider information technology systems to provision subscriber billing information associated with the ordered service, the third and fourth application programming interfaces included in the first one of the second sets of application programming interfaces.

5. The method of claim 1, wherein the first messaging also identifies a second device, and further including:

exchanging respective instances of fourth messaging with respective ones of the different service provider information technology systems to identify a third one of the different service provider information technology systems associated with the second device, the fourth messaging respectively conforming to the second sets of application programming interfaces that are specific to the different service provider information technology systems; and exchanging fifth messaging with the third one of the different service provider information technology systems to determine service offerings available for the second device.

6. A tangible machine readable storage medium comprising machine readable instructions which, when executed, cause a machine to perform operations comprising:

accessing first messaging received via a network from an enterprise mobility management system to identify a first device, the first messaging conforming to a first set of application programming interfaces;

exchanging respective instances of second messaging with respective ones of a plurality of different service provider information technology systems to identify a first one of the different service provider information technology systems associated with the first device, the instances of the second messaging including first data from the first messaging and respectively conforming to second sets of application programming interfaces that are specific to the different service provider information technology systems, the second sets of application programming interfaces different from the first set of application programming interfaces;

exchanging third messaging with the first one of the different service provider information technology systems to determine service offerings available for the first device, the first data including a device identifier identifying the first device, and the exchanging of the respective instances of the second messaging with the respective ones of the different service provider information technology systems including:

including the device identifier in a first message conforming to a first application programming interface to query the first one of the different service provider information technology systems to qualify devices for service provisioning, the first application programming interface included in a first one of the second sets of application programming interfaces specific to the first one of the different service provider information technology systems;

transmitting the first message to the first one of the different service provider information technology systems;

accessing a second message received from the first one of the different service provider information technology systems;

transmitting a third message including the device identifier to a second one of the different service provider information technology systems, the third message conforming to a second application programming interface to query the second one of the different service provider information technology systems to qualify devices for service provisioning, the second application programming interface included in a second one of the second sets of application programming interfaces specific to the second one of the different service provider information technology systems;

determining that the second one of the different service provider information technology systems is not associated with the first device when a fourth message received from the second one of the different service provider information technology systems indicates that the first device is not qualified for service provisioning; and determining that the first one of the different service provider information technology systems is associated with the first device when the second message received from the first one of the different service provider information technology systems indicates that the first device is qualified for service provisioning.

7. The tangible machine readable storage medium of claim 6, wherein the first set of application programming interfaces is agnostic to the different service provider information technology systems, the third messaging conforms to the first one of the second sets of application programming interfaces specific to the first one of the different service provider information technology systems, and the operations further include:

transforming the third messaging to fourth messaging conforming to the first set of application programming interfaces; and exchanging the fourth messaging with the enterprise mobility management system to convey the service offerings available for the first device to the enterprise mobility management system.

8. The tangible machine readable storage medium of claim 7, wherein the operations further include:

transforming fifth messaging received from the enterprise mobility management system and conforming to the first set of application programming interfaces to sixth messaging conforming to the first one of the respective second sets of application programming interfaces specific to the first one of the different service provider information technology systems; and exchanging the sixth messaging with the first one of the different service provider information technology systems to order at least one of the service offerings available for the first device.

9. The tangible machine readable storage medium of claim 8, wherein the fifth messaging includes a fifth message conforming to one of the first application programming interfaces to select a first service to order from a listing of available service offerings, and the sixth messaging includes (1) a sixth message conforming to a third application programming interface to request the first one of the different service provider information technology systems to provision enterprise billing information associated with an ordered service, and (2) a seventh message conforming to a fourth application programming interface to request the first one of the different service provider information technology systems to provision subscriber billing information associated with the ordered service, the third and fourth application programming interfaces included in the first one of the second sets of application programming interfaces.

10. The tangible machine readable storage medium of claim 6, wherein the first messaging also identifies a second device, and the operations further include:

exchanging respective instances of fourth messaging with respective ones of the different service provider information technology systems to identify a third one of the different service provider information technology systems associated with the second device, the fourth messaging respectively conforming to the second sets of application programming interfaces that are specific to the different service provider information technology systems; and exchanging fifth messaging with the third one of the different service provider information technology systems to determine service offerings available for the second device.

11. An apparatus to interface with a plurality of different service provider information technology systems supporting service ordering, the apparatus comprising:

memory including machine readable instructions; and a processor to execute the instructions to perform operations including:

accessing first messaging received via a network from an enterprise mobility management system to identify a first device, the first messaging conforming to a first set of application programming interfaces;

exchanging respective instances of second messaging with respective ones the different service provider information technology systems to identify a first one of the different service provider information technology systems associated with the first device, the instances of the second messaging including first data from the first messaging and respectively conforming to second sets of application programming interfaces that are specific to the respective ones of the different service provider information technology systems, the second sets of application programming interfaces different from the first set of application programming interfaces;

exchanging third messaging with the first one of the different service provider information technology systems to determine service offerings available for the first device, the first data including a device identifier identifying the first device, and the exchanging of the respective instances of the second messaging with the respective ones of the different service provider information technology systems including:

including the device identifier in a first message conforming to a first application programming interface to query the first one of the different service provider information technology systems to qualify devices for service provisioning, the first application programming interface included in a first one of the second sets of application programming interfaces specific to the first one of the different service provider information technology systems;

transmitting the first message to the first one of the different service provider information technology systems;

accessing a second message received from the first one of the different service provider information technology systems;

transmitting a third message including the device identifier to a second one of the different service provider information technology systems, the third message conforming to a second application programming interface to query the second one of the different service provider information technology systems to qualify devices for service provisioning, the second application programming interface included in a second one of the second sets of application programming interfaces specific to the second one of the different service provider information technology systems;

determining that the second one of the different service provider information technology systems is not associated with the first device when a fourth message received from the second one of the different service provider information technology systems indicates that the first device is not qualified for service provisioning; and determining that the first one of the different service provider information technology systems is associated with the first device when the second message received from the first one of the different service provider information technology systems indicates that the first device is qualified for service provisioning.

12. The apparatus of claim 11, wherein the first set of application programming interfaces is agnostic to the different service provider information technology systems, the third messaging conforms to the first one of the second sets of application programming interfaces is specific to the first one of the different service provider information technology systems, and the operations further include:

transforming the third messaging to fourth messaging conforming to the first set of application programming interfaces; and exchanging the fourth messaging with the enterprise mobility management system to convey the service offerings available for the first device to the enterprise mobility management system.

13. The apparatus of claim 12, wherein the operations further include:

transforming fifth messaging received from the enterprise mobility management system and conforming to the first set of application programming interfaces to sixth messaging conforming to the first one of the respective second sets of application programming interfaces specific to the first one of the different service provider information technology systems; and exchanging the sixth messaging with the first one of the different service provider information technology systems to order at least one of the service offerings available for the first device.

14. The apparatus of claim 13, wherein the fifth messaging includes a fifth message conforming to one of the first application programming interfaces to select a first service to order from a listing of available service offerings, and the sixth messaging includes (1) a sixth message conforming to a third application programming interface to request the first one of the different service provider information technology systems to provision enterprise billing information associated with an ordered service, and (2) a seventh message conforming to a fourth application programming interface to request the first one of the different service provider information technology systems to provision subscriber billing information associated with the ordered service, the third and fourth application programming interfaces included in the first one of the second sets of application programming interfaces.

15. The apparatus of claim 11, wherein the first messaging also identifies a second device, and the operations further include:

exchanging respective instances of fourth messaging with respective ones of the different service provider information technology systems to identify a third one of the different service provider information technology systems associated with the second device, the fourth messaging respectively conforming to the second sets of application programming interfaces that are specific to the different service provider information technology systems; and exchanging fifth messaging with the third one of the different service provider information technology systems to determine service offerings available for the second device.

* * * * *